US009810167B2

(12) United States Patent
Watanabe et al.

(10) Patent No.: US 9,810,167 B2
(45) Date of Patent: Nov. 7, 2017

(54) CATALYST ADVANCED WARMUP CONTROL DEVICE FOR SPARK IGNITION ENGINE

(71) Applicant: MAZDA MOTOR CORPORATION, Hiroshima (JP)

(72) Inventors: Tomomi Watanabe, Higashihiroshima (JP); Shigeyuki Hirashita, Hiroshima (JP); Naoki Kishikawa, Hatsukaichi (JP); Keiji Araki, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 151 days.

(21) Appl. No.: 14/655,704

(22) PCT Filed: Jan. 15, 2014

(86) PCT No.: PCT/JP2014/000157
§ 371 (c)(1),
(2) Date: Jun. 25, 2015

(87) PCT Pub. No.: WO2014/112370
PCT Pub. Date: Jul. 24, 2014

(65) Prior Publication Data
US 2015/0337751 A1 Nov. 26, 2015

(30) Foreign Application Priority Data

Jan. 16, 2013 (JP) ................. 2013-005230

(51) Int. Cl.
*F02D 41/02* (2006.01)
*F01N 9/00* (2006.01)
(Continued)

(52) U.S. Cl.
CPC ....... *F02D 41/0255* (2013.01); *F01N 3/2006* (2013.01); *F01N 9/00* (2013.01);
(Continued)

(58) Field of Classification Search
CPC .. F02D 13/00; F02D 13/0242; F02D 13/0249; F02D 37/02; F02D 41/024;
(Continued)

(56) References Cited

U.S. PATENT DOCUMENTS 5,588,409 A * 12/1996 Mizuno ................. F02P 5/1508
123/339.11
2009/0293842 A1 12/2009 Akazaki et al.

FOREIGN PATENT DOCUMENTS

JP 2002-303164 A 10/2002
JP 2002303164 A * 10/2002
(Continued)

OTHER PUBLICATIONS

International Search Report; PCT/JP2014/000157; dated Apr. 15, 2014.

*Primary Examiner* — Lindsay Low
*Assistant Examiner* — Robert Werner
(74) *Attorney, Agent, or Firm* — Studebaker & Brackett PC

(57) ABSTRACT

When a catalytic converter in an exhaust passage is in an un-activated state, an intake air amount is increased, as compared to when the converter is in an activated state under the same engine operation condition, and an ignition timing is retarded beyond a TDC of a compression stroke. The ignition timing is set such that a retard amount thereof from the TDC becomes larger as an external load causing a rotational resistance of an engine becomes lower. A valve opening start timing of an exhaust valve is set such that, when the external load is lower than a given reference load, the valve starts opening, before an in-cylinder pressure reaches a peak, according to combustion of an air-fuel mixture ignited at the above ignition timing, in a subsequent expansion stroke, wherein the in-cylinder pressure is based (Continued)

on an assumption that the valve is maintained in a valve-closed state.

11 Claims, 12 Drawing Sheets

(51) Int. Cl.
| | |
|---|---|
| *F02D 43/04* | (2006.01) |
| *F02D 41/06* | (2006.01) |
| *F02D 13/02* | (2006.01) |
| *F02P 5/15* | (2006.01) |
| *F02D 37/02* | (2006.01) |
| *F02D 41/00* | (2006.01) |
| *F01N 3/20* | (2006.01) |
| *F02B 23/10* | (2006.01) |

(52) U.S. Cl.
CPC ............ *F02D 13/02* (2013.01); *F02D 37/02* (2013.01); *F02D 41/0002* (2013.01); *F02D 41/0245* (2013.01); *F02D 41/064* (2013.01); *F02D 43/04* (2013.01); *F02P 5/1502* (2013.01); *F02P 5/1506* (2013.01); *F01N 2430/08* (2013.01); *F01N 2900/1626* (2013.01); *F02B 23/104* (2013.01); *F02D 2041/001* (2013.01); *Y02T 10/18* (2013.01); *Y02T 10/26* (2013.01); *Y02T 10/42* (2013.01); *Y02T 10/46* (2013.01)

(58) Field of Classification Search
CPC ............. F02D 41/0245; F02D 41/0255; F02D 35/023; F01N 3/2006; F01N 3/2033; F01N 2430/10
USPC ........... 701/105, 111, 113, 110; 60/300, 320; 123/406.44, 90.15, 347, 406.41, 406.42; 73/114.16
See application file for complete search history.

(56) References Cited

FOREIGN PATENT DOCUMENTS

| | | |
|---|---|---|
| JP | 2004-308601 A | 11/2004 |
| JP | 2005-207378 A | 8/2005 |
| JP | 2006-258020 A | 9/2006 |
| JP | 2007-321590 A | 12/2007 |
| JP | 2007321590 A * | 12/2007 |
| JP | 2009-216001 A | 9/2009 |
| JP | 2009-287493 A | 12/2009 |
| JP | 2010-024920 A | 2/2010 |

\* cited by examiner

DETAIL DIAGRAM OF
INJECTION SURFACE

CATALYST ADVANCED WARMUP CONTROL DEVICE FOR SPARK IGNITION ENGINE

TECHNICAL FIELD

The present invention relates to a rapid catalyst warmup control device for a spark ignition engine, and belongs to a technical field of measures against exhaust emissions of an internal combustion engine.

BACKGROUND ART

Heretofore, a technique, called "AWS (Accelerated Warm-up System)", has been employed in a spark ignition engine to achieve rapid activation of a catalytic converter provided in an exhaust passage, in some cases. This AWS is a technique configured to, when the catalytic converter is in an un-activated state, for example, just after a cold start of the engine, increase an intake air amount as compared to when the catalytic converter is in an activated state under the same engine operation condition (e.g., under an idling operation), and retard an ignition timing beyond a top dead center of a compression stroke, to allow an air-fuel mixture to undergo after-burning in a subsequent expansion stroke to thereby increase an exhaust gas temperature and thus an exhaust gas heat amount to accelerate warmup of the catalytic converter (see, for example, the following Patent Literature 1).

CITATION LIST

Patent Literature

Patent Literature 1: JP 2007-321590 A

SUMMARY OF INVENTION

During execution of the AWS, the ignition timing is retarded beyond a top dead center of a compression stroke, so that the air-fuel mixture is combusted in a subsequent expansion stroke, causing a rise in in-cylinder pressure or heat release rate ($dQ/d\theta$), i.e., a heat release amount per unit crank angle, in a last half of the expansion stroke. This timing is coincident with a timing at which an exhaust valve for opening and closing an exhaust port starts opening, so that energy of a blowdown stream flowing from the cylinder to the exhaust port upon opening of the exhaust valve increases. As a result, an amplitude of an exhaust pulsation within an exhaust passage increases, causing a problem of an increase in radiation noise from an exhaust system and thus an increase in exhaust noise.

In order to cope with this problem, it is conceivable to reduce the intake air amount to thereby lower an engine speed. In this case, however, due to a decrease in the exhaust gas heat amount, an effect of achieving rapid activation of the catalytic converter undesirably deteriorates.

It is therefore an object of the present invention to provide a rapid catalyst warmup control device for a spark ignition engine, capable of, during execution of the AWS, suppressing exhaust noise while maintaining an effect of achieving rapid activation of a catalytic converter.

As means to solve the above technical problem, the present invention provides a rapid catalyst warmup control device for a spark ignition engine, which is configured to, when a catalytic converter provided in an exhaust passage is in an un-activated state, increase an intake air amount, as compared to when the catalytic converter is in an activated state under a same engine operation condition, and retard an ignition timing beyond a top dead center of a compression stroke. The rapid catalyst warmup control device comprises: an ignition timing setting section configured to set the ignition timing in such a manner that a retard amount thereof from a top dead center of a compression stroke becomes larger as an external load causing a rotational resistance of the engine becomes lower; and an exhaust valve opening timing setting section configured to set a valve opening start timing of an exhaust valve in such a manner that, when the external load is lower than a given reference load, the exhaust valve starts opening, before an in-cylinder pressure reaches a peak, according to combustion of an air-fuel mixture ignited at the ignition timing set by the ignition timing setting section, in a subsequent expansion stroke, wherein the in-cylinder pressure is based on an assumption that the exhaust valve is maintained in a valve-closed state.

As means to solve the above technical problem, the present invention also provides a rapid catalyst warmup control device for a spark ignition engine, which is configured to, when a catalytic converter provided in an exhaust passage is in an un-activated state, increase an intake air amount, as compared to when the catalytic converter is in an activated state under a same engine operation condition, and retard an ignition timing beyond a top dead center of a compression stroke. The rapid catalyst warmup control device comprises an ignition timing setting section configured to set the ignition timing in such a manner that a retard amount thereof from a top dead center of a compression stroke becomes larger as an external load causing a rotational resistance of the engine becomes lower; and an exhaust valve opening timing setting section configured to set a valve opening start timing of an exhaust valve in such a manner that, when the external load is lower than a given reference load, the exhaust valve starts opening, before a heat release rate or a heat release amount per unit crank angle reaches a peak, according to combustion of an air-fuel mixture ignited at the ignition timing set by the ignition timing setting section, in a subsequent expansion stroke.

The above and other objects, features and advantages of the present invention will be apparent from the following detailed description and the accompanying drawings.

DESCRIPTION OF EMBODIMENTS

Based on the drawings, an embodiment of the present invention will now be described.

First Embodiment

(1) General Configuration

Figure 1:
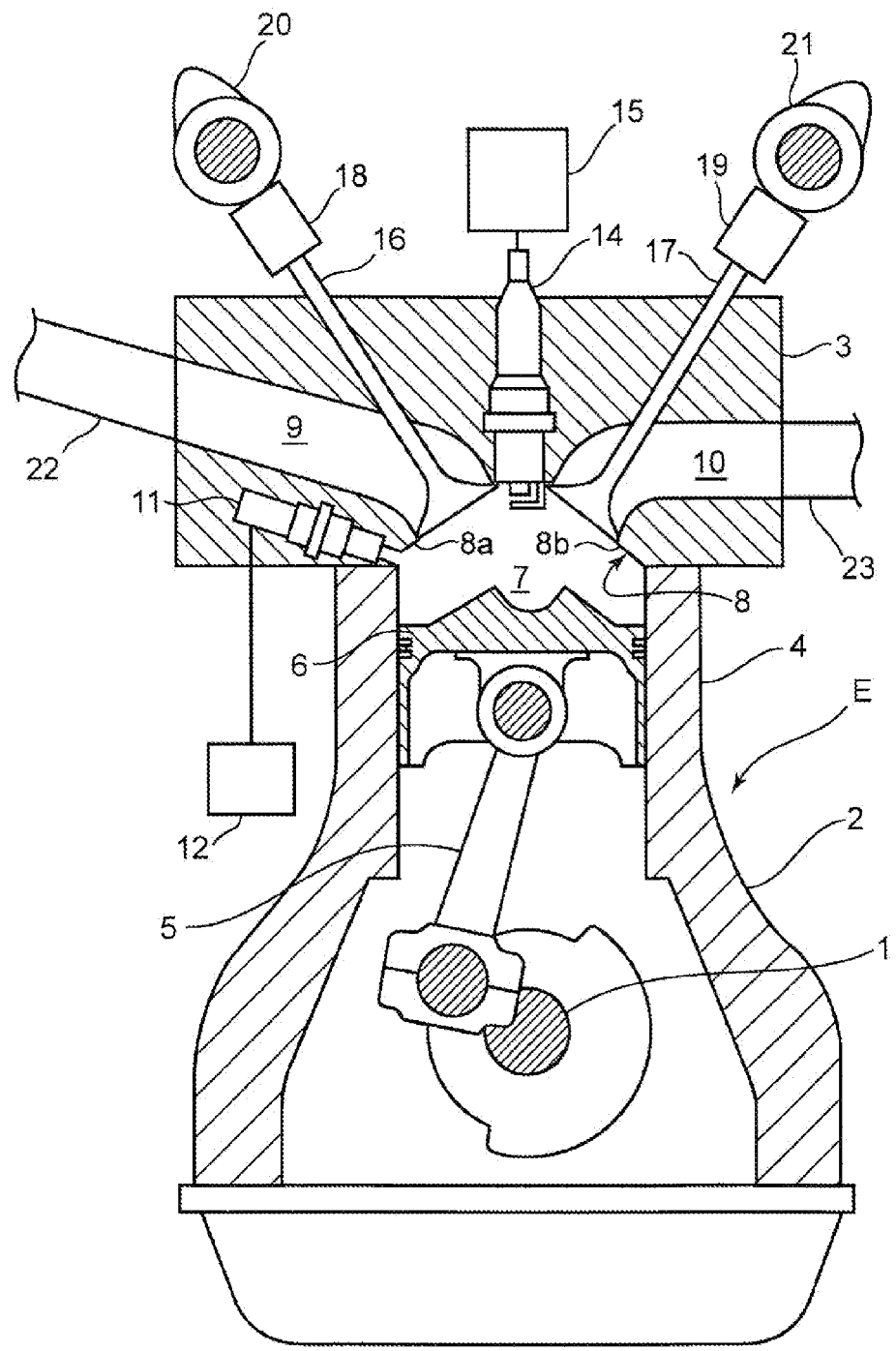
FIG. 1 is a schematic configuration diagram of a spark ignition engine according to a first embodiment of the present invention.

As illustrated in FIG. 1, an engine E according to this embodiment is an in-line four-cylinder (see FIG. 6) spark ignition engine which comprises a cylinder block 2 rotatably supporting a crankshaft 1, and a cylinder head 3 disposed on a top of the cylinder block 2, wherein four cylinders 4 are provided in the cylinder block 2 and the cylinder head 3.

Each of the cylinders 4 houses a piston 6 coupled to the crankshaft 1 via a connecting rod 5. A combustion chamber 7 is formed above the piston 6. The cylinder head 3 has a bottom formed as a ceiling wall 8 defining the combustion chamber 7 for each of the cylinders 4. The ceiling wall 8 has a pent roof shape formed such that an intake-side inclined surface 8a and an exhaust-side inclined surface 8b each extending from a central region to a lower end of the cylinder head 3 are opposed to each other. An intake port 9 is opened in the intake-side inclined surface 8a, and an exhaust port 10 is opened in the exhaust-side inclined surface 8b. Each of the intake port 9 and the exhaust port 10 is branched into two sub-ports, on the side of the cylinder 4 (see FIG. 6), wherein each of the intake sub-ports 9 is provided with an intake valve 16 for opening and closing the intake sub-port 9, and each of the exhaust sub-ports 10 is provided with an exhaust valve 17 for opening and closing the exhaust sub-port 10. That is, a pair of intake valves 16 and a pair of exhaust valves 17 are provided per cylinders 4.

A multi-hole injector (fuel injection valve) 11 is disposed at a lower end of the intake-side inclined surface 8a in a posture where it is oriented obliquely downwardly. The multi-hole injector 11 is connected to a fuel supply system 12, and configured to, in response to an event that the fuel supply system 12 receives a pulse signal from an engine control unit (ECU) 13 (see FIG. 8), inject fuel directly into the combustion chamber 7 in an amount corresponding to a pulse width of the pulse signal, at a timing of the receiving of the pulse signal. A detailed structure of the multi-hole injector 11 will be described later.

A spark plug 14 is provided in the central region of the ceiling wall 8 for each of the cylinders 4. The spark plug 14 is fixed to the cylinder head 3 in such a manner that an electrode 14a (see FIG. 2) thereof is exposed to an inside of the combustion chamber 7. The spark plug 14 is connected to an ignition circuit 15, and configured to, in response to an event that the ignition circuit 15 receives a control signal from the ECU 13, discharge a spark at the electrode 14a to perform ignition, at a timing of the receiving of the control signal.

The pair of intake valves 16 and the pair of exhaust valves 17 in each of the cylinders 4 are provided with a tappet unit 18 and a tappet unit 19, respectively. The tappet unit 18 and the tappet unit 19 are driven, respectively, by an intake valve cam 20 and an exhaust valve cam 21 of a non-illustrated valve actuating mechanism provided in the cylinder head 3, in association with engine rotation.

Figure 8:
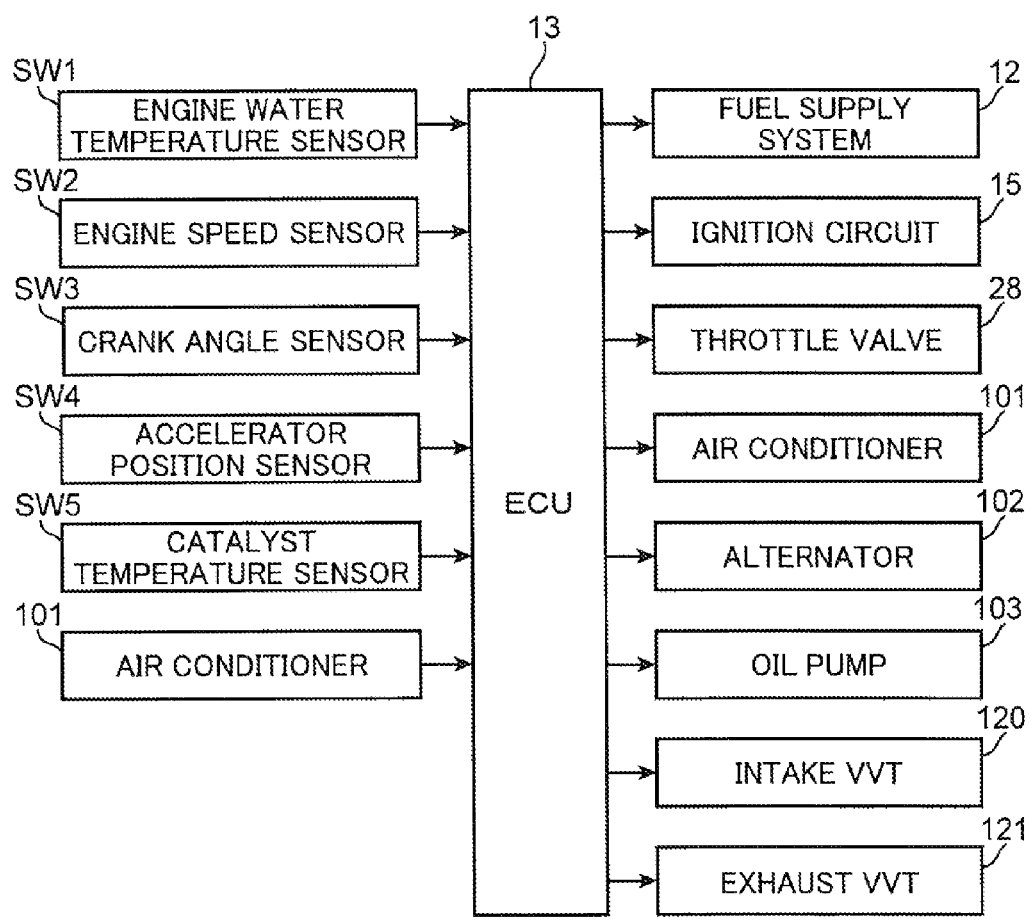
FIG. 8 is a diagram of a control system of the engine.

More specifically, the valve actuating mechanism comprises a non-illustrated intake camshaft and a non-illustrated exhaust camshaft provided, respectively, with the intake valve cam 20 and the exhaust valve cam 21, an intake VVT 120 and an exhaust VVT 121 (see FIG. 8). The intake camshaft and the exhaust camshaft are coupled to and rotationally driven by the crankshaft 1 via a chain or the like.

Each of the intake VVT 120 and the exhaust VVT 121 is a mechanism for changing a phase difference between the crankshaft 1 and a corresponding one of the intake camshaft and the exhaust camshaft to thereby change a corresponding one of a valve timing of the pair of intake valves 16 and a valve timing of the pair of exhaust valves 17. The intake VVT 120 and the exhaust VVT 121 are operable, in response to a control signal from the ECU 13, to change the valve timing of the pair of intake valves 16 and the valve timing of the pair of exhaust valves 17, respectively.

In this embodiment, the intake VVT 120 and the exhaust VVT 121 are configured to change respective valve opening timings IVO, EVO and valve closing timings IVC, EVC of the pair of intake valves 16 and the pair of exhaust valves 17 (see FIG. 9), while keeping respective valve open periods and valve lift amounts, i.e., valve profiles, of the pair of intake valves 16 and the pair of exhaust valves 17 constant.

In this embodiment, the valve open period in each of the pair of intake valves 16 and the pair of exhaust valves 17 means an interval of a valve-lifted period, except for a valve opening start zone and a valve closing completion zone where a valve lift curve has a gentle slope (ramp zones). Further, the valve opening timing and the valve closing timing in each of the pair of intake valves 16 and the pair of exhaust valves 17 mean, respectively, a valve opening start timing and a valve closing completion timing defining the above valve open period. For example, in the case where the ramp zone has a height of 0.2 mm, a timing at which the valve lift amount is increased to 0.2 mm and a timing at which the valve lift amount is reduced to 0.2 mm are defined as the valve opening timing and the valve closing timing, respectively.

Independent intake pipes 22 of an intake manifold are connected, respectively, to the intake ports 9. A throttle valve 28 (see FIG. 8) is provided on an intake upstream side of the independent intake pipes 22 to adjust an intake air amount. The throttle valve 28 is configured such that a degree of opening thereof is changed in response to a control signal from the ECU 13. Independent exhaust pipes 23 of an exhaust manifold are connected, respectively, to the exhaust ports 10.

Figure 6:
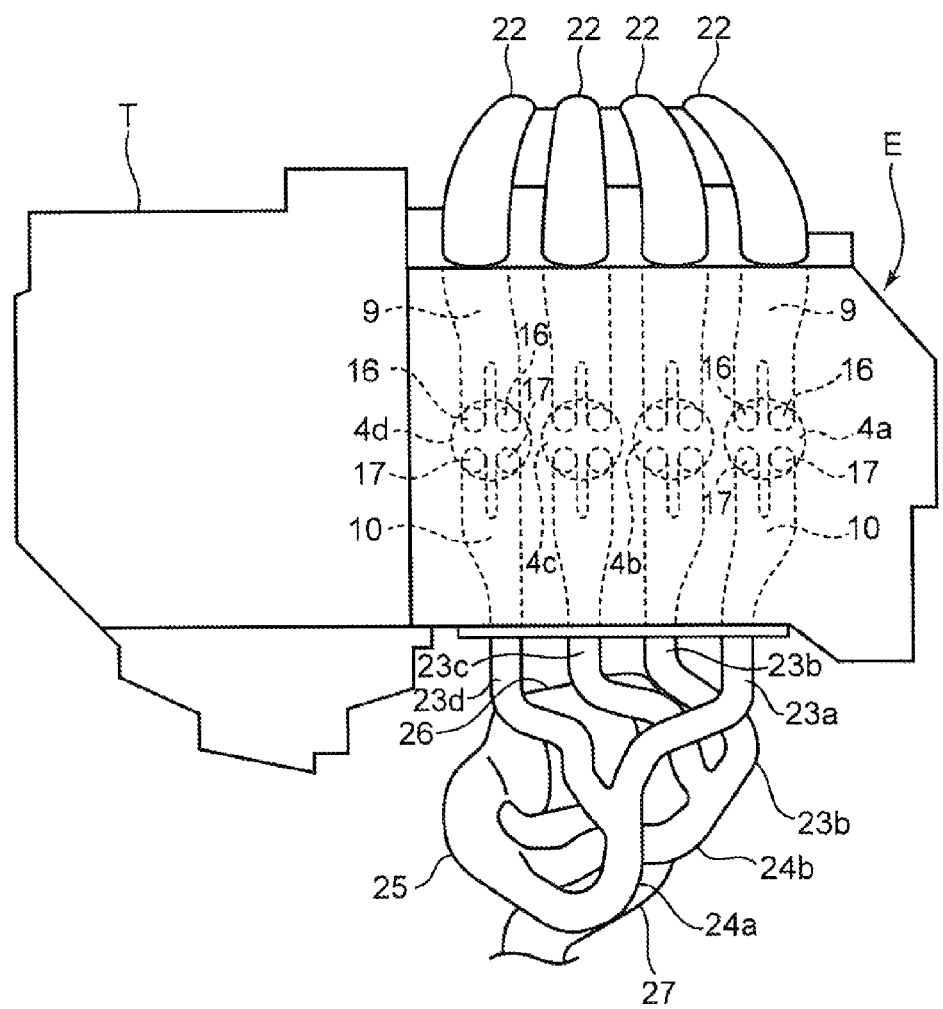
FIG. 6 is a top plan view illustrating an exhaust upstream portion of an exhaust system of the engine.

Next, with reference to FIG. 6, a structure of an exhaust system of the engine E will be described. As illustrated in FIG. 6, the engine E is transversely mounted on a front of a vehicle in a posture where an intake system is located on a front side in a front-rear direction of the vehicle, and the exhaust system is located on a rear side in the front-rear direction of the vehicle. A transmission T is joined to one end of the engine E in a cylinder row direction, and a combination of the engine E and the transmission T makes up a power train. The transmission T is an automatic transmission (AT) comprising a non-illustrated torque converter and a non-illustrated speed change gear mechanism. That is, the vehicle in this embodiment is an AT vehicle. In this case, the torque converter is a heavy object coupled to the crankshaft 1, and is therefore an external load causing a rotational resistance of the engine E.

The four cylinders consists of a first cylinder 4a, a second cylinder 4b, a third cylinder 4c and a fourth cylinder 4d which are arranged in this order from a non-transmission side toward a transmission side, wherein a sequence of intake, compression, expansion and exhaust strokes is performed in each of the first cylinder 4a, the third cylinder 4c, the fourth cylinder 4d and the second cylinder 4b in this order, while the stroke sequence is shifted by one stroke between successive two of the four cylinders.

A first one 23a and a fourth one 23d of the independent exhaust pipes connected, respectively, to the first and fourth cylinders 4a, 4d whose exhaust strokes are not mutually successive are arranged to extend in a rearward direction of the vehicle, independently, and then merged to form a first merged pipe 24a. Similarly, a second one 23b and a third one 23c of the independent exhaust pipes connected, respectively, to the second and third cylinders 4b, 4c whose exhaust strokes are not mutually successive are arranged to extend in the rearward direction of the vehicle, independently, and then merged to form a second merged pipe 24b. The first merged pipe 24a and the second merged pipe 24b are curved and merged to form a single collector pipe 25. That is, the exhaust system of the engine E has a structure, called "4-2-1 exhaust system".

Figure 7:
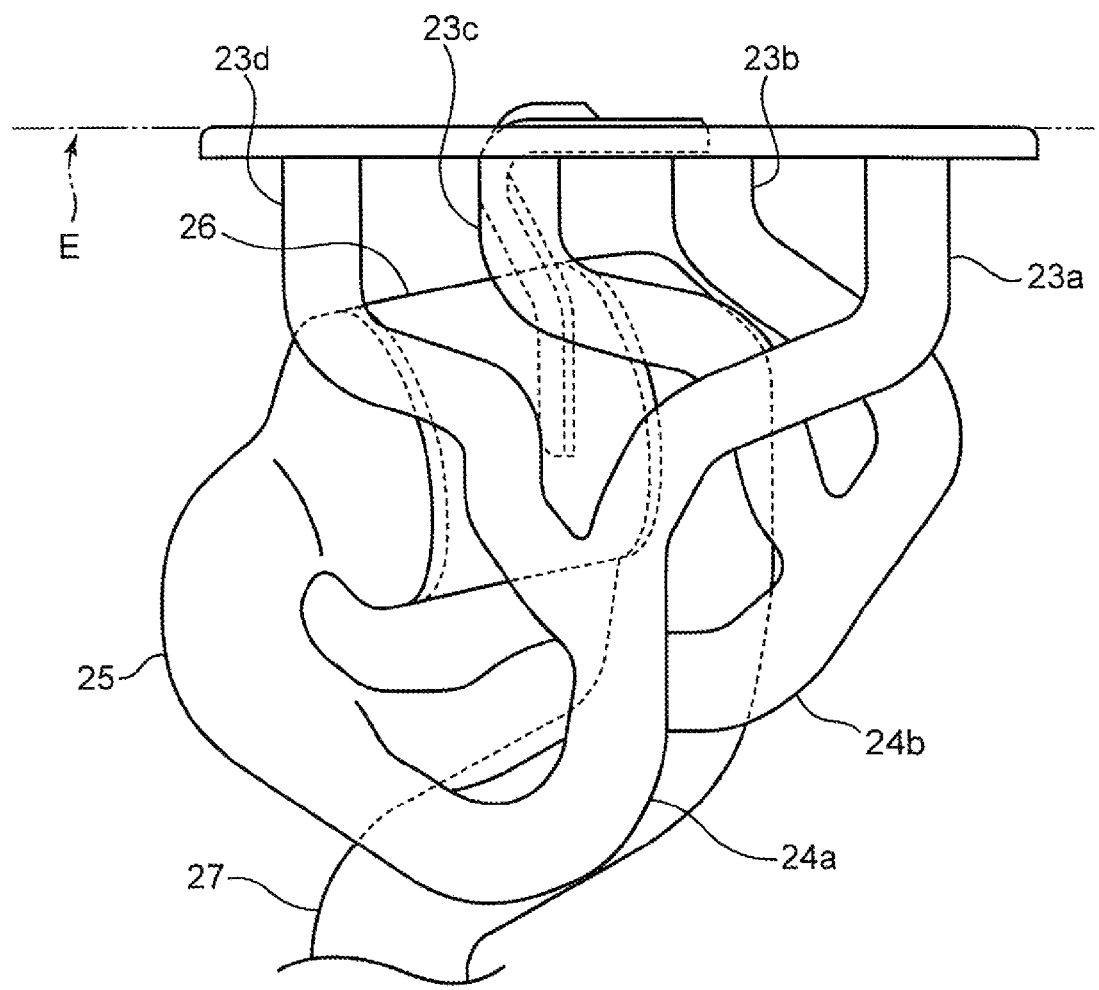
FIG. 7 is an enlarged top plan view of the exhaust upstream portion.

Then, as also illustrated in FIG. 7, a catalytic converter 26 is connected to an exhaust downstream side of the collector pipe 25, and a single exhaust pipe 27 is connected to an exhaust downstream side of the catalytic converter 26. Although not illustrated, the exhaust pipe 27 is disposed to extend in the rearward direction of the vehicle, and a silencer and others are interposed therein. The catalytic converter 26 is comprised of a three-way catalyst, and designed, particularly, to purify HC and CO during a cold start of the engine E. For this purpose, the catalytic converter 26 is disposed on a relatively exhaust upstream side of the exhaust system of the engine E.

However, the exhaust system of the engine E is intended to promote scavenging of the cylinders 4a to 4d by means of exhaust pulsation, so that a distance from a cylinder-side opening of each of the exhaust ports 10 to the catalytic converter 26 is set to a relatively large value. This makes it difficult for the catalytic converter 26 to be adequately warmed up due to an exhaust gas temperature drop. Thus, it is necessary to employ the AWS for activating the catalytic converter 26.

Moreover, with a view to weight reduction of the engine E, each of the independent exhaust pipes 23a to 23d, the merged pipes 24a, 24b, the collector pipe 25 and the exhaust pipe 27 is prepared using a thin-walled steel pipe made, for example, of stainless steel. Therefore, the exhaust system of the engine E is more likely to generate radiation noise. Thus, it is necessary to take measures to suppress exhaust noise.

In this embodiment, each of the independent exhaust pipes 23a to 23d (independent exhaust pipes 23), the merged pipes 24a, 24b, the collector pipe 25 and the exhaust pipe 27 is equivalent to "exhaust passage" set forth in the appended claims.

Figure 2:
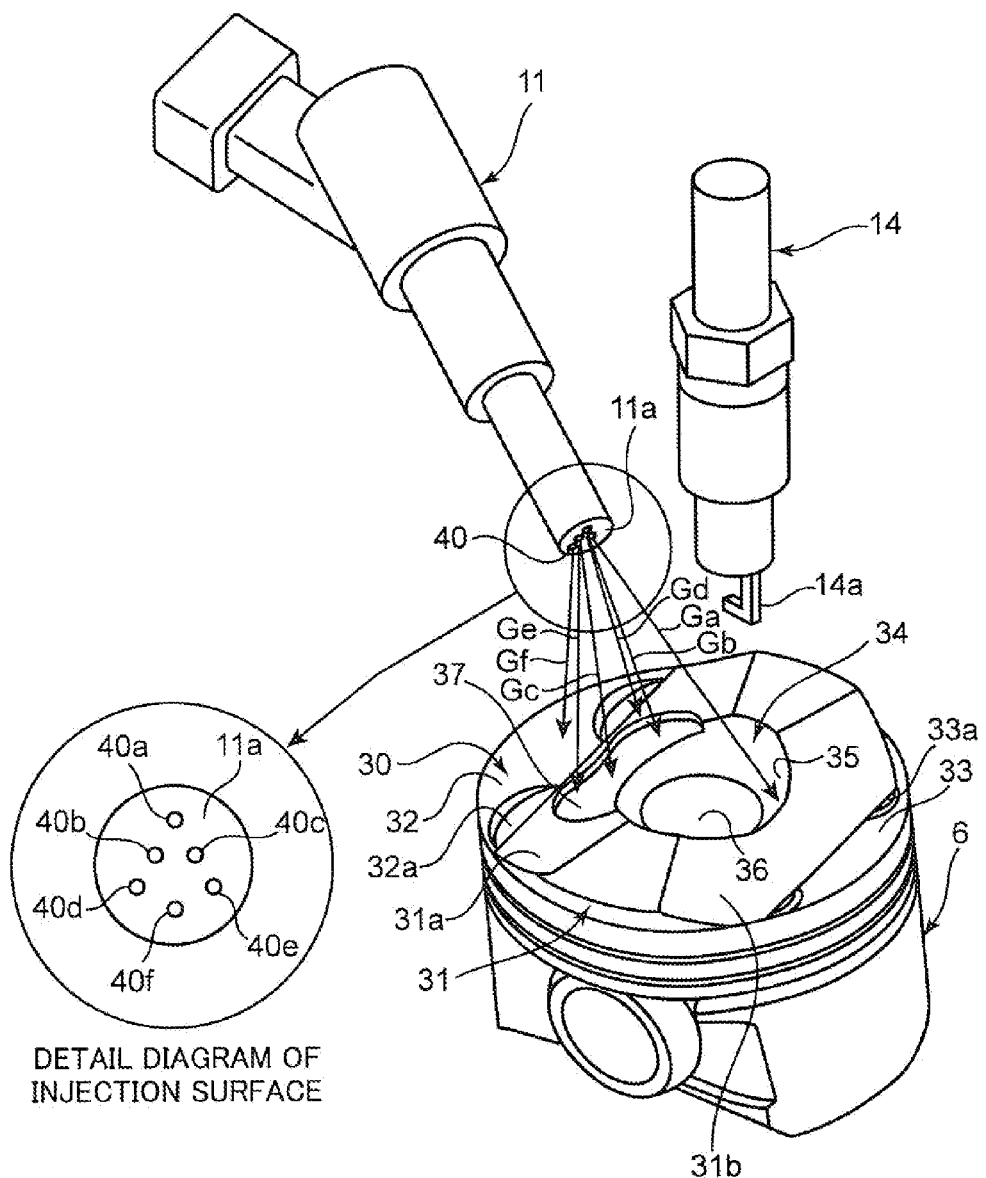
FIG. 2 is a perspective view illustrating detailed structures of a multi-hole injector, a piston, and a spark plug.

Next, with reference to FIG. 2, a structure of the multi-hole injector 11 will be described. As illustrated in FIG. 2, the injector 11 is disposed to allow an injection surface 11a as a distal edge face thereof to be oriented obliquely downwardly, and configured to inject a plurality of (in the illustrated embodiment, six) fuel spray jets Ga to Gf toward a piston crown surface 30 of the piston 6 which is located around a position corresponding to a top dead center of a compression stroke.

As illustrated in the detail diagram of the injection surface, the injection surface 11a is formed with six nozzle holes 40a to 40f. Specifically, the injection surface 11a has: a first nozzle hole 40a formed at a center of an uppermost region thereof; a second nozzle hole 40b and a third nozzle hole 40c formed on the respective sides of left and right ends of a second-uppermost region thereof; a fourth nozzle hole 40d and a fifth nozzle hole 40e formed on the respective sides of left and right ends of a third-uppermost region thereof; and a sixth nozzle hole 40f formed at a center of a lowermost region thereof.

Each of the nozzle holes 40 has an extremely small diameter which is, for example, as small as about 0.1 mm. A fuel injection amount and a fuel injection direction from each of the nozzle holes 40 is determined by the diameter and orientation of the nozzle hole 40. Specifically, a first spray jet Ga from the first nozzle hole 40a is injected in an upwardmost and central direction, and a second spray jet Gb from the second nozzle hole 40b and a third spray jet Gc from the third nozzle hole 40c are injected in respective directions offset leftwardly and rightwardly and oriented downwardly, with respect to the first spray jet Ga. A fourth spray jet Gd from the fourth nozzle hole 40d and a fifth spray jet Ge from the fifth nozzle hole 40e are injected in respective directions offset leftwardly and rightwardly and oriented downwardly, with respect to the second and third spray jets Gb, Gc, and a sixth spray jet Gf from the sixth nozzle hole 40f is injected in a downwardmost and central direction. In this case, the first spray jet Ga is injected below the electrode 14a of the spark plug 14 so as to prevent fuel from adhering to the electrode 14a.

Based on the above structure, the multi-hole injector 11 is operable to uniformly inject the plurality of fuel spray jets Ga to Gf obliquely downwardly into the cylinder. In a homogeneous combustion mode during a normal operation, fuel is supplied throughout an inside of the cylinder, so that it becomes possible to efficiently combust an air-fuel mixture therein. In addition, during execution of the AWS, a weakly stratified state can be created in the cylinder by adequately controlling a fuel injection timing, as described later. As used here, the term "weakly stratified state" means a state in which an air-fuel mixture in the cylinder becomes relatively rich around the spark plug 14 (more specifically, around the electrode 14a of the spark plug 14) and becomes relatively lean around the relatively rich air-fuel mixture (weak stratification of the in-cylinder air-fuel mixture).

Next, with reference to FIG. 3, a structure of the piston 6 will be described. As illustrated in FIG. 3, the piston 6 in this embodiment has a pent roof-shaped raised portion 31 provided in the piston crown surface 30, correspondingly to the pent roof-shaped ceiling wall 8 defining the combustion chamber 7. That is, the raised portion 31 has an intake-side inclined surface 31a and an exhaust-side inclined surface 31b which are formed in opposed relation to each other along a crankshaft direction.

The piston crown surface 30 has an intake-side horizontal surface region 32 and an exhaust-side horizontal surface region 33 provided, respectively, on intake and exhaust sides with respect to the raised portion 31 to serve as a reference plane thereof. The intake-side horizontal surface region 32 and the exhaust-side horizontal surface region 33 have, respectively, a pair of intake valve recesses 32*a* and a pair of exhaust valve recesses 33*a* each corresponding to a respective one of the pair of intake valves 16 and the pair of exhaust valves 17 (see FIG. 2).

The raised portion 31 also has a central region formed as a concave-shaped cavity 34 having an approximately circular shape in top plan view. The concave-shaped cavity 34 has an inner peripheral surface 35 formed as an approximately hemispherical surface, and a bottom surface 36 formed as an approximately horizontal surface, whereby, when the piston 6 is located around a top dead center position, an approximately spherical-shaped combustion space having a center at the electrode 14*a* of the spark plug 14 is formed. This approximately spherical-shaped combustion space provides an engine having a significantly high compression ratio.

Figure 3A:
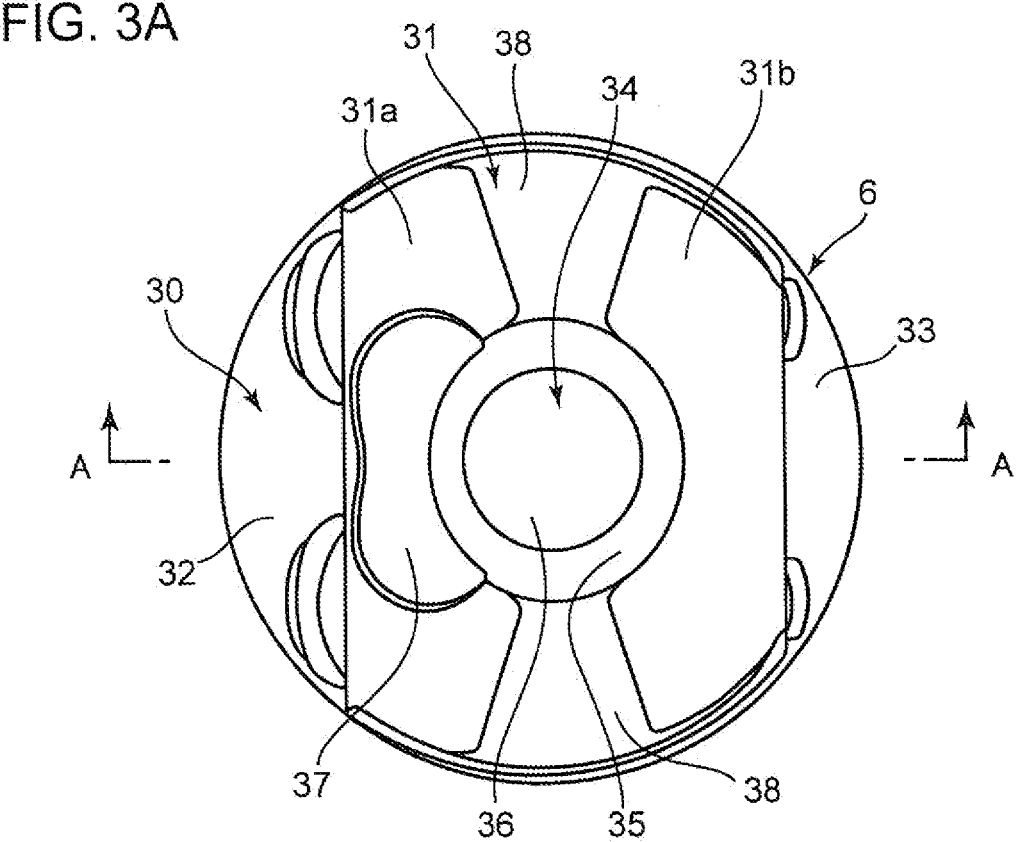
FIG. 3A is a top plan view of a piston crown surface of the piston.
Figure 3B:
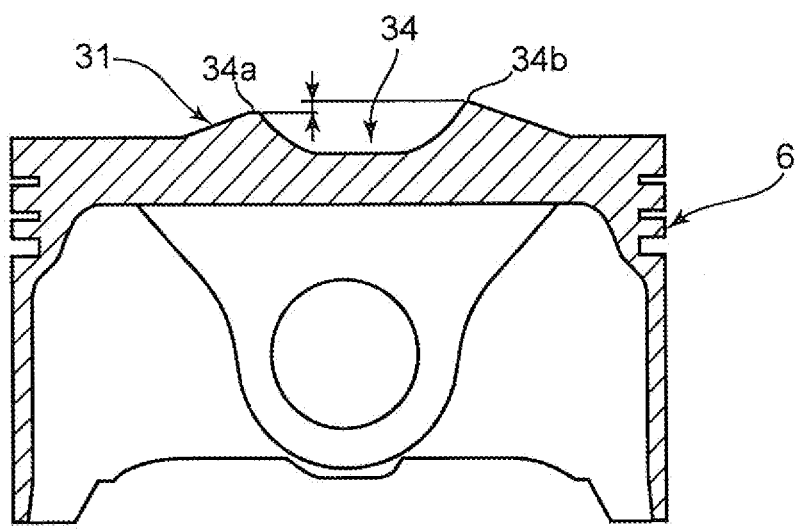
FIG. 3B is a sectional view of the piston, taken along the line A-A.

As illustrated in FIG. 3A, the intake-side inclined surface 31*a* is partially formed as a receiving surface 37 for receiving a fuel spray jet. The receiving surface 37 is formed on a concave portion having an approximately oval shape in top plan view. As a result of forming the receiving surface 37, an intake-side upper edge 34*a* of the concave-shaped cavity 34 becomes located below an exhaust-side upper edge 34*b* thereof, as illustrated in FIG. 3B. Thus, the first spray jet Ga injected from the injector 11 becomes more likely to enter into the concave-shaped cavity 34 and becomes less likely to escape from the concave-shaped cavity 34.

As illustrated in FIG. 3A, a ridge region of the raised portion 31 between the intake-side inclined surface 31*a* and the exhaust-side inclined surface 31*b*, except the concave-shaped cavity 34, is formed as upper surface regions 38, 38. Each of the upper surface regions 38, 38 is composed of an inclined surface which becomes lower in height toward an outer periphery of the piston. In an upper region of the combustion chamber 7, the upper surface regions 38, 38 form a communication space for communicating between an intake side and an exhaust side even when the piston 6 is located at a top dead center position.

(2) Basic Operation of AWS

Next, with reference to FIG. 9, an operation state during a cold start of the engine E will be described. When it is detected by a catalyst temperature sensor SW5 (see FIG. 8) or the like that the catalytic converter 26 has not been warmed up, for example, just after a cold start of the engine E, and it is determined that the catalytic converter 26 is in an un-activated state, the AWS (Accelerated Warm-up System) is executed by the ECU 13. The AWS is a technique configured to, when the catalytic converter 26 is in the un-activated state, increase the intake air amount as compared to when the catalytic converter 26 is in an activated state under the same engine operation condition (e.g., under an idling operation), and retard an ignition timing beyond a top dead center of a compression stroke, to allow an air-fuel mixture to undergo after-burning in a subsequent expansion stroke to thereby increase an exhaust gas temperature and thus an exhaust gas heat amount (heat flux) to accelerate warmup of the catalytic converter 26.

During execution of the AWS, the multi-hole injector 11 is controlled by the ECU 13, in such a manner as to inject fuel in a split manner, specifically, once in an intake stroke and once in a subsequent compression stroke, twice in total, per one cycle.

Figure 9:
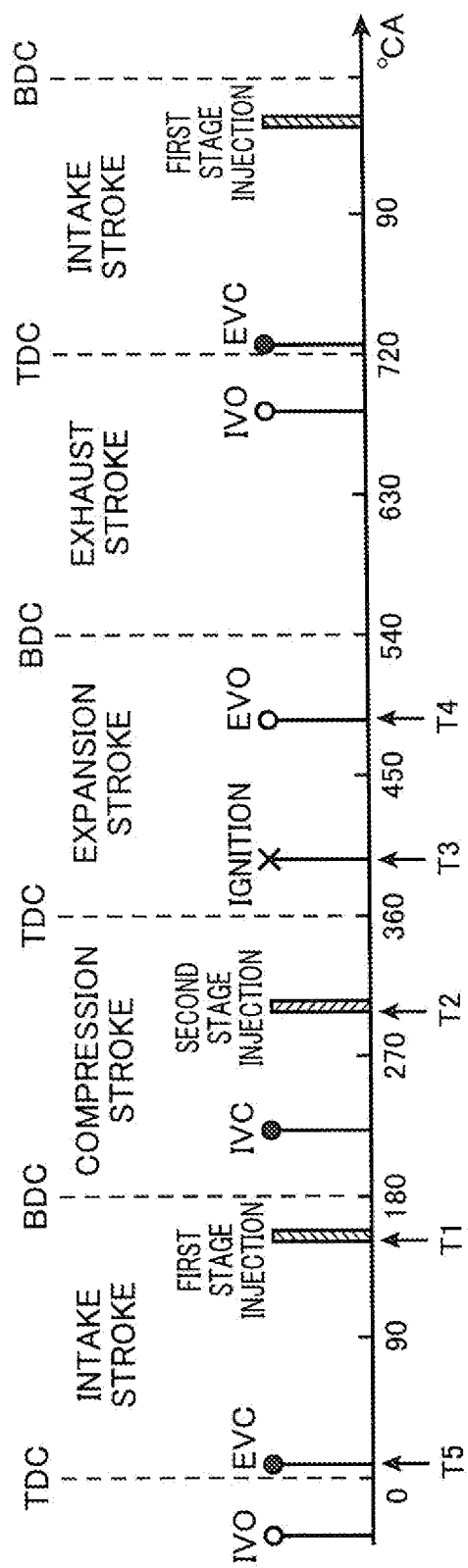
FIG. 9 is a time chart of a fuel injection timing, an ignition timing, and valve opening and valve closing timings of intake and exhaust valves, during execution of the AWS.

More specifically, as illustrated in FIG. 9, assuming that a start point of an intake stroke is 0° CA (where "° CA" denotes crank angle), the injector 11 is configured to start a first stage injection at a given timing T1 in a final phase of an intake stroke (e.g., at 150 to 170° CA), and further start a second stage injection at a given timing T2 in a final phase of a subsequent compression stroke (e.g., at 300 to 320° CA). Respective fuel injection amounts in the two stages are set such that a total of the fuel injection amounts realizes the theoretical air-fuel ratio (A/F=14.7).

As a result of injecting fuel in a split manner at appropriate timings, a weakly stratified state is created in the cylinder. That is, fuel from the first stage injection in the intake stroke is vaporized or atomized early in the cylinder, and then a layer of a rich air-fuel mixture having a relatively high fuel concentration is formed around the spark plug 14 by the second stage injection in the compression stroke.

Further, during execution of the AWS, the spark plug 14 is controlled by the ECU 13, in such a manner as to perform ignition at a timing which is beyond a top dead center (TDC) of a compression stroke to a large extent. That is, the ignition timing is retarded beyond a top dead center of a compression stroke, i.e., in such a manner as to be shifted to a point on a subsequent expansion stroke. In this case, the ignition timing is changed depending on a level of an external load against the engine E (whether the external load is high or low), as described later. FIG. 9 illustrates one example in which the ignition timing is set to a given timing T3 in an early phase of an expansion stroke (e.g., 375 to 400° CA).

As a result of retarding the ignition timing in this manner, a significant part of combustion energy of the engine E is converted to heat energy (i.e., a rate at which the combustion energy is converted to a work to push the piston 6 downwardly is reduced), causing an increase in exhaust loss. This results in an increase in the exhaust gas temperature and thus the exhaust gas heat amount, so that warmup of the catalytic converter 26 is accelerated. Therefore, the catalytic converter 26 is rapidly activated, and purification of exhaust gas can be initiated in an earlier stage. Additionally, in this embodiment, the ignition timing is retarded beyond a top dead center of a compression stroke to a large extent (e.g. by 36° CA, as indicated by the solid line in FIG. 11), so that an air-fuel mixture undergoes after-burning in a subsequent expansion stroke. This results in a further increase in the exhaust gas temperature and thus the exhaust gas heat amount, so that an effect of rapidly activating the catalytic converter 26 is enhanced.

Furthermore, during execution of the AWS, the throttle valve 28 is controlled by the ECU 13, in such a manner as to increase the intake air amount, as compared to when the catalytic converter 26 is in the activated state under the same idling operation. This makes it possible to maintain torque and engine rotation even though the ignition timing is retarded beyond a top dead center of a compression stroke. In addition, an exhaust gas amount is increased, so that it becomes possible to further increase the exhaust gas heat amount.

Meanwhile, retarding of the ignition timing is likely to make a combustion state unstable and fail to reliably establish combustion. In this embodiment, the in-cylinder air-fuel mixture is weakly stratified by adequately controlling the fuel injection timing, so that it becomes possible to obtain a stable combustion state even though the ignition timing is largely retarded.

Specifically, the sixth spray jet Gf to be injected from the sixth nozzle hole 40f in the downwardmost direction is set such that, when injected in the first stage injection in an intake stroke, it enters into the concave-shaped cavity 34 of the piston crown surface 30 without reaching an inner peripheral wall (liner) of the cylinder. In this way, the sixth spray jet Gf injected in the downwardmost direction reaches the piston crown surface 30, so that it becomes possible to prevent fuel from adhering to a lower region of the inner peripheral wall of the cylinder having a lowest temperature in the inside of the cylinder. Thus, vaporization or atomization of fuel in the intake stroke is promoted to suppress a situation where HC (raw HC) as an unburned component is contained in exhaust gas.

Figure 4:
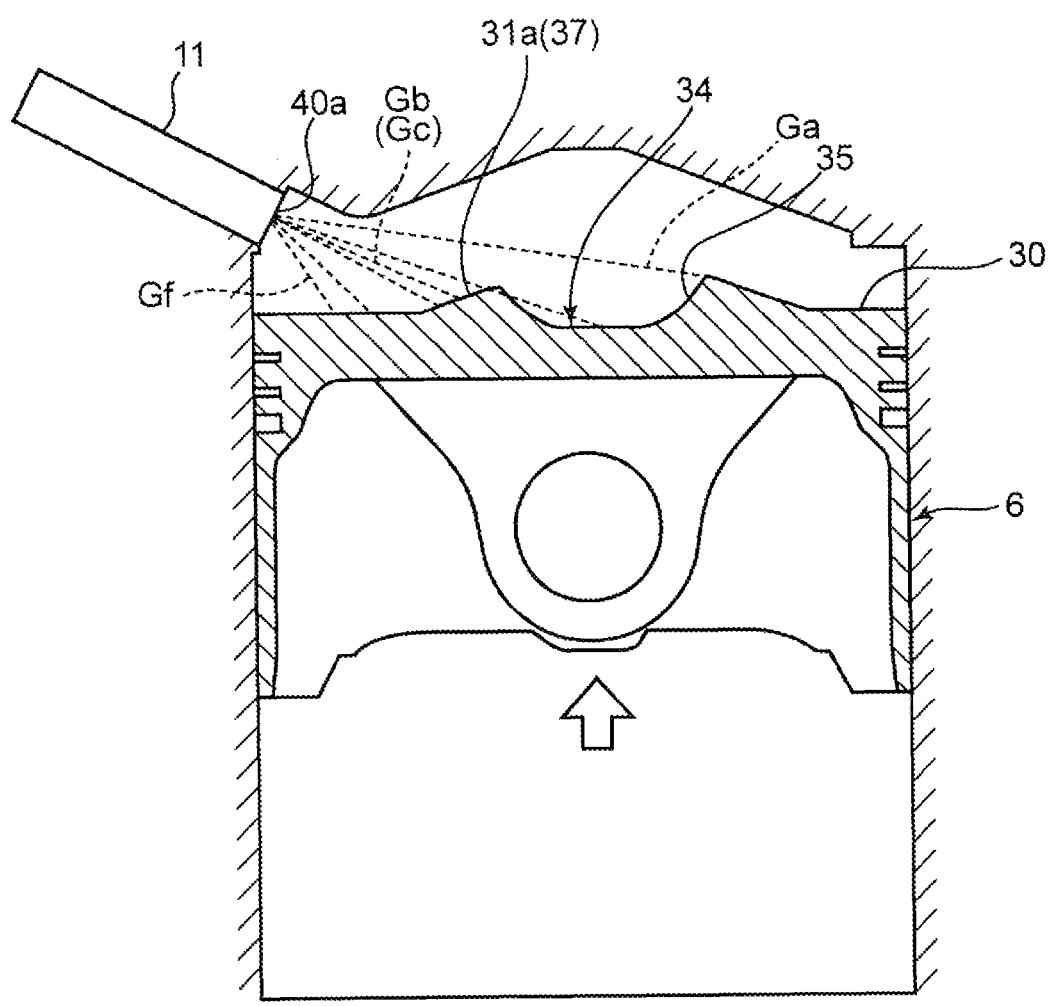
FIG. 4 is a side view illustrating a state of fuel injection in a compression stroke.

On the other hand, as illustrated in FIG. 4, the first spray jet Ga to be injected from the first nozzle hole 40a in the upwardmost direction is set such that, when injected in the second stage injection in the compression stroke, it enters into the concave-shaped cavity 34 of the piston crown surface 30, more specifically, it is directed toward the inner peripheral surface 35 of the concave-shaped cavity 34. Further, the second spray jet Gb from the second nozzle hole 40b and the third spray jet Gc from the third nozzle hole 40c are set to be directed toward the intake-side inclined surface 31a on a nearer side than the concave-shaped cavity 34, more specifically, toward the receiving surface 37. The second spray jet Gb and the third spray jet Gc which have lost stream due to collision with the receiving surface 37 are drawn into the concave-shaped cavity 34 by a vacuum generated after passing of the first spray jet Ga.

Figure 5A:
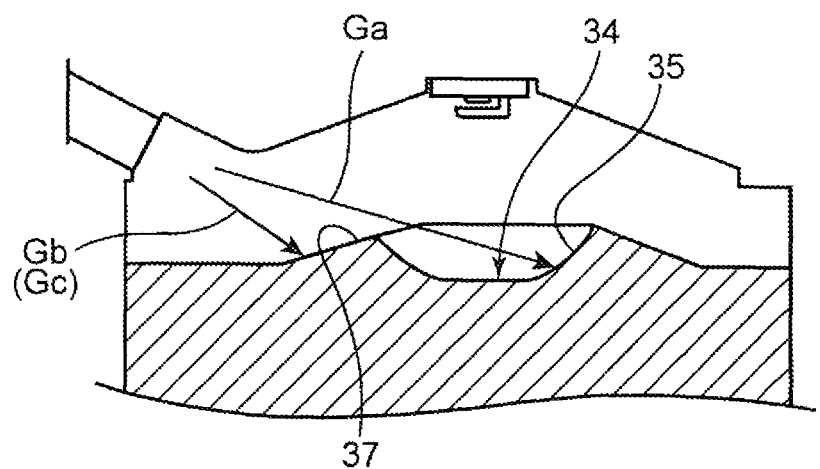
FIG. 5A is a schematic explanatory diagram of a state of an inside of a combustion chamber just after fuel injection.
Figure 5B:
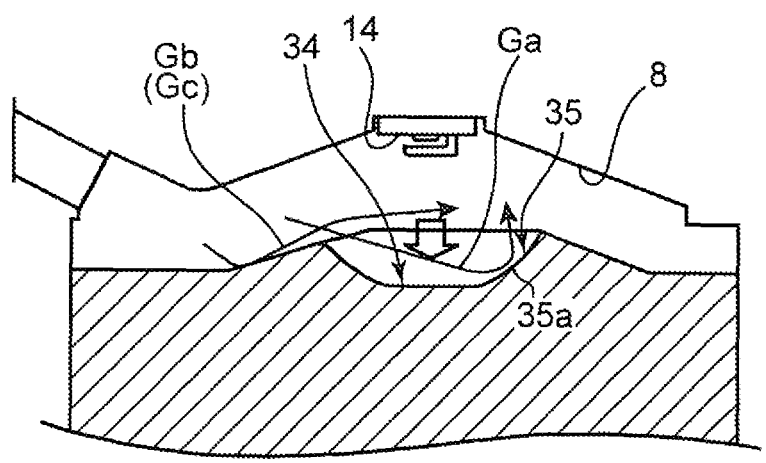
FIG. 5B is a schematic explanatory diagram of the subsequent state.

Next, with reference to FIG. 5, this draw-in phenomenon will be described. As illustrated in FIG. 5A, the first spray jet Ga is injected toward the approximately hemispherical-shaped inner peripheral surface 35 of the concave-shaped cavity 34. Thus, as illustrated in FIG. 5B, the first spray jet Ga is quite smoothly turned upwardly while being guided by an arc-shaped inclined surface region 35a of the inner peripheral surface 35, and directed toward the spark plug 14 (ceiling wall 8).

On the other hand, as illustrated in FIG. 5A, the second spray jet Gb and the third spray jet Gc are injected toward the receiving surface 37. Thus, the second spray jet Gb and the third spray jet Gc loses stream due to collision with the receiving surface 37, and drifts above the receiving surface 37. In this situation, a vacuum providing a drawing force toward an inside of the concave-shaped cavity 34 is generated after passing of the first spray jet Ga. Thus, as illustrated in FIG. 5B, the second spray jet Gb and the third spray jet Gc are drawn into the concave-shaped cavity 34 by the vacuum.

In this way, in addition to the first spray jet Ga, the second spray jet Gb and the third spray jet Gc are drawn into the concave-shaped cavity 34. This allows much more fuel to be located around the spark plug 14, so that a rich air-fuel mixture having a higher fuel concentration can exist around the spark plug 14 in a larger amount.

The second spray jet Gb and the third spray jet Gc are injected into the receiving surface 37 depressed from the intake-side inclined surface 31a in a stepped manner. This allows them to be suppressed from escaping out of the intake-side inclined surface 31a, so as to be reliably drawn into the cavity 34.

(3) Control System

As illustrated in FIG. 8, the vehicle (AT vehicle) in this embodiment is provided with: an engine water temperature sensor SW1 for detecting an engine water temperature; an engine speed sensor SW2 for detecting an engine speed; a crank angle sensor SW3 for detecting a rotational angle of the crankshaft 1; an accelerator position sensor SW4 for detecting the presence or absence of operation of an accelerator (depression of an accelerator pedal) by a driver and an amount of operation of the accelerator (amount of depression of the accelerator pedal); and a catalyst temperature sensor SW5 for detecting a temperature of the catalytic converter 26. The ECU 13 is electrically connected to each of the sensors SW1 to SW5.

The ECU 13 is a microprocessor comprising a CPU, a ROM and a RAM, as is well known, and equivalent to "ignition timing setting section", "exhaust valve opening timing setting section", "injection timing setting section" and "external load reducing section" set forth in the appended claims.

The ECU 13 is configured to control a normal operation (homogeneous combustion) of the engine E, based on various information input from the sensors SW1 to SW5 provided in the vehicle, and, when the catalytic converter 26 is in the un-activated state in case of a cold start of the engine E, execute the AWS for achieving rapid activation of the catalytic converter 26.

In order to execute the AWS, the ECU 13 is electrically connected to each of the fuel supply system 12, the ignition circuit 15, the throttle valve 28, an air conditioner (more specifically, its compressor) 101, an alternator 102, an oil pump 103, the intake VVT 120 and the exhaust VVT 121, and configured to output a control signal to each of the devices. Among the above devices, an auxiliary component such as the air conditioner 101, the alternator 102 or the oil pump 103 is configured to be coupled to and driven by the crankshaft 1 via a belt or the like, and is therefore an external load causing a rotational resistance of the engine E.

(4) Features of First Embodiment

Figure 10:
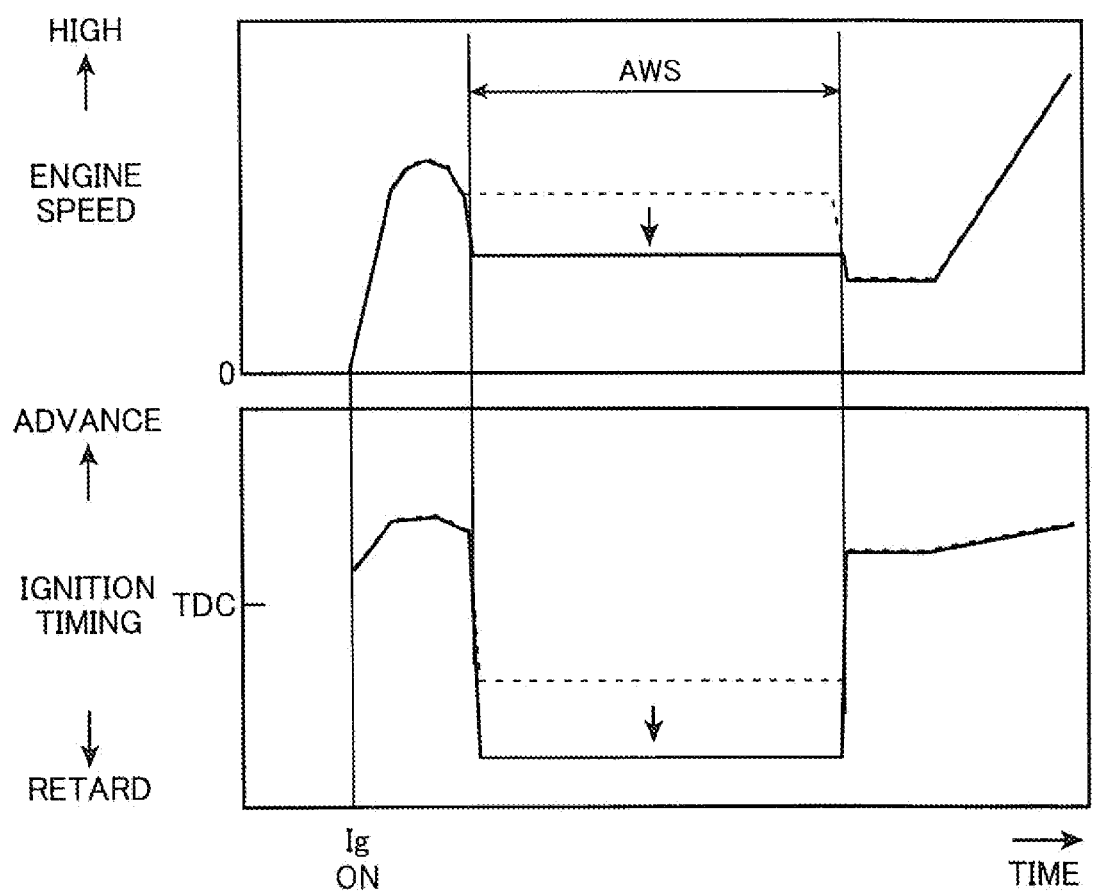
FIG. 10 is a time chart of an engine speed and the ignition timing, during execution of the AWS.
Figure 11A:
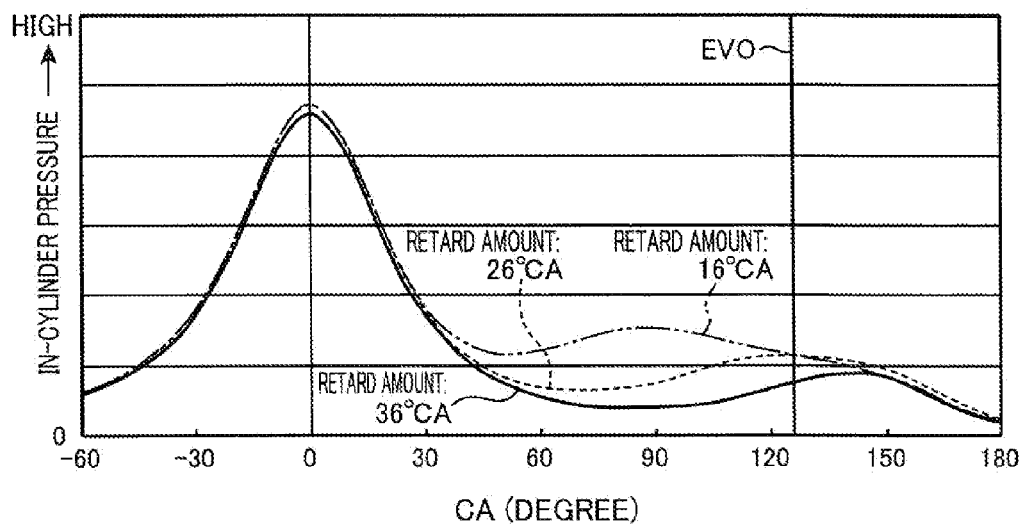
FIG. 11A is a time chart of an in-cylinder pressure during execution of the AWS, under the condition that a retard amount of the ignition timing is set to 16° CA·ATDC, 26° CA·ATDC, and 36° CA·ATDC, wherein the valve opening timing of the exhaust valve is superposed thereon.

Next, with reference to FIGS. 9 to 11, features of this embodiment will be described. FIG. 9 is a time chart of the fuel injection timing, the ignition timing, and the valve opening timings IVO, EVO and the valve closing timings IVC, EVC of the intake and exhaust valves, during execution of the AWS, and FIG. 10 is a time chart of the engine speed and the ignition timing, during execution of the AWS. FIG. 11A is a time chart of an in-cylinder pressure during execution of the AWS, under the condition that a retard amount of the ignition timing is set to 16° CA·ATDC (after a top dead center of a compression stroke), 26° CA·ATDC, and 36° CA·ATDC, wherein the valve opening timing EVO of the pair of exhaust valves 17 is superposed thereon, and FIG. 11B is an enlarged time chart of a part of the time chart of FIG. 11A corresponding to a last half of a subsequent expansion stroke.

Figure 11B:
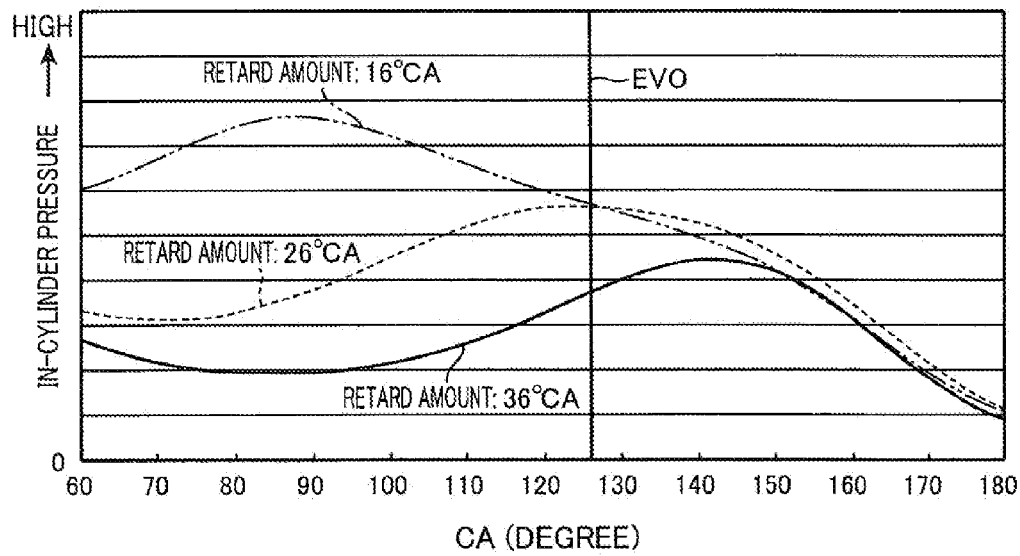
FIG. 11B is an enlarged time chart of a part of the time chart of FIG. 11A corresponding to a last half of an expansion stroke.

Each of the time charts of FIGS. 11A and 11B indicates changes (waveform) of an in-cylinder pressure on an assumption that each of the pair of exhaust valves 17 is maintained in a valve-closed state during the expansion stroke. This characteristic is preliminarily determined by way of experiment, and data about the characteristic is stored in the ECU 13.

During execution of the AWS, the ECU 13 operates to retard the ignition timing beyond a top dead center of a compression stroke, as mentioned above, so that an air-fuel mixture is combusted in a subsequent expansion stroke and thereby the in-cylinder pressure rises and reaches a peak in a last half of the expansion stroke. This timing is coincident with the valve opening start timing EVO of the pair of exhaust valves 17, so that energy of a blowdown stream flowing from the cylinder 4 to the exhaust ports 10 upon opening of the pair of exhaust valves 17 increases. As a result, an amplitude of an exhaust pulsation within the independent exhaust pipes 23*a* to 23*d*, the merged pipes 24*a*, 24*b* and the collector pipe 25 increases, causing an increase in radiation noise from the exhaust system and thus an increase in exhaust noise. If the intake air amount is reduced to thereby lower the engine speed in order to cope with this problem, an effect of achieving rapid activation of the catalytic converter 26 will undesirably deteriorate due to a decrease in the exhaust gas heat amount.

Therefore, in order to suppress exhaust noise while maintaining the effect of achieving rapid activation of the catalytic converter 26, the ECU 13 is configured to, during execution of the AWS, set the ignition timing in such a manner that a retard amount thereof from a top dead center of a compression stroke becomes larger as the external load against the engine E becomes lower, and set the valve opening start timing EVO of the pair of exhaust valves 17 in such a manner that, when the external load is lower than a given reference load, each of the pair of exhaust valves 17 starts opening, before an in-cylinder pressure rises and reaches a peak, according to combustion of an air-fuel mixture ignited at the set ignition timing, in a subsequent expansion stroke, wherein the in-cylinder pressure is based on an assumption that each of the pair of exhaust valves 17 is maintained in a valve-closed state during the expansion stroke, and, when the external load is higher than the given reference load, each of the pair of exhaust valves 17 starts opening, after the in-cylinder pressure reaches the peak.

As illustrated in FIG. 10, the ECU 13 is configured to execute the AWS for a given time, during an idling operation after a complete explosion during a start-up of the engine E. During execution of the AWS, the ECU 13 operates to retard the ignition timing beyond a top dead center (TDC) of a compression stroke. This causes lowering in torque and engine speed, as compared to the case where such ignition timing retard is not performed, unless the intake air amount is increased by controlling the throttle valve 28. In addition, the ECU 13 operates to set the ignition timing in such a manner that a retard amount thereof from a top dead center of a compression stroke becomes larger as the external load against the engine E becomes lower, as indicated by the arrowed direction along which the retard amount is changed from the broken line to the solid line in FIG. 10. Thus, the engine speed is significantly lowered as the external load becomes lower. In FIG. 10, the broken line represents the case where the retard amount of the ignition timing is 16° CA·ATDC (after a top dead center of a compression stroke), and the solid line represents the case where the retard amount of the ignition timing is 36° CA·ATDC.

As illustrated in FIG. 9, in this embodiment, the valve open period in each of the pair of intake valves 16 and the pair of exhaust valves 17, i.e., a period between the valve opening timing IVO, EVO and the valve closing timing IVC, EVC in each of the pair of intake valves 16 and the pair of exhaust valves 17, is set relatively larger. Particularly, during execution of the AWS, the intake VVT 120 and the exhaust VVT 121 are controlled by the ECU 13, in such a manner as to provide an overlap period during which the pair of intake valves 16 and the pair of exhaust valves 17 are opened together across a top dead center of an exhaust stroke (720° CA). In this case, an advance amount of the valve opening timing IVO of the pair of intake valves 16, from the top dead center of an exhaust stroke is set to be greater than a retard amount of the valve closing timing EVC of the pair of exhaust valves 17, from the top dead center of an exhaust stroke. As a result, a large amount of exhaust gas, i.e., internal EGR gas, is discharged into the intake system, and therefore the degree of opening of the throttle valve 28 is increased so as to ensure a fresh air amount. Thus, it becomes possible to reduce pumping loss to thereby achieve enhanced fuel economy.

Specifically, as illustrated in FIG. 9, during execution of the AWS, the valve opening timing IVO of the pair of intake valves 16 is set to an approximately intermediate timing in a last half of an exhaust stroke, and the valve closing timing IVC of the pair of intake valves 16 is set to an approximately intermediate timing in a first half of a compression stroke. On the other hand, the valve opening timing EVO of the pair of exhaust valves 17 is set to a given timing T4 in an intermediate phase or a final phase of an expansion stroke (e.g., at 470 to 490° CA), and the valve closing timing EVC of the pair of exhaust valves 17 is set to a given timing T5 in an early phase of an intake stroke (e.g., at 0 to 10° CA). In this manner, the valve opening timing EVO of the pair of exhaust valves 17 is largely advanced from a bottom dead center (BDC) of an expansion stroke.

In this embodiment, the external load against the engine E can be variously changed depending on a degree of driving, an ON/OFF state or the like of the air conditioner 101, the alternator 102 and the oil pump 103. In this embodiment, the external load becomes the highest when the air conditioner 101 is in an ON state, and the alternator 102 and the oil pump 103 are, respectively, in a maximum electricity-generating state (in which a current value of a field coil for generating a magnetic field in the alternator 102 is set to a maximum value) and in a maximum driven state (in which an oil discharge pressure of the oil pump 103 is set to a maximum value). On the other hand, the external load becomes the lowest when the air conditioner 101 is in an OFF state, and the alternator 102 and the oil pump 103 are, respectively, in a minimum electricity-generating state (in which the current value of the field coil is set to a minimum value) and in a minimum driven state (in which the oil discharge pressure is set to a minimum value). The ECU 13 is configured to, when the external load is highest, control the ignition circuit 15 in such a manner as to set the retard amount of the ignition timing to 16° CA·ATDC (after a top dead center of a compression stroke) (see FIG. 11), and, when the external load is lowest, control the ignition circuit 15 in such a manner as to set the retard amount of the ignition timing to 36° CA·ATDC (see FIG. 11).

As illustrated in FIG. 11A and FIG. 11B, when the retard amount of the ignition timing is 16° CA·ATDC (two-dot chain line), the peak of the in-cylinder pressure arises at 90° CA·ATDC, and, when the retard amount of the ignition timing is 36° CA·ATDC (solid line), the peak of the in-cylinder pressure arises at 140° CA·ATDC. In the two cases indicated by the solid line and the two-dot chain line, each of the intake air amount and the fuel injection amount is adjusted to approximately the same value. As mentioned above, the ECU 13 is configured to increase the retard amount of the ignition timing from a top dead center of a compression stroke along with lowering of the external load against the engine E. That is, as the external load against the engine E becomes lower (in the solid line as compared to the two-dot chain line), a timing at which the in-cylinder pressure reaches a peak is delayed, and a value of the peak of the in-cylinder pressure becomes lower.

In this embodiment, the term "reference load" means an external load for which a characteristic curve is set such that the peak of the in-cylinder pressure arises at a timing between a timing (90° CA·ATDC) at which the peak of the in-cylinder pressure arises when the external load is highest and a timing (140° CA·ATDC) at which the peak of the in-cylinder pressure arises when the external load is lowest. In this embodiment, the reference load is an external load for which a characteristic curve (broken line) is set such that the retard amount of the ignition timing is 26° CA·ATDC, as illustrated in FIG. 11. This external load (reference load) has a value between the aforementioned highest external load and the aforementioned lowest external load, and can be achieved by a given combination of the ON/OFF state of the air conditioner 101, the electricity-generating state of the alternator 102 and the driven state of the oil pump 103.

As illustrated in FIGS. 11A and 11B, the ECU 13 is configured to, when the retard amount of the ignition timing is 36° CA·ATDC (solid line), i.e., the external load is lowest, set the valve opening start timing EVO of the pair of exhaust valves 17 to 126° CA·ATDC (54° CA·BBDC) which is an earlier timing than 140° CA·ATDC at which the in-cylinder pressure reaches a peak. In this case, the in-cylinder pressure is relatively low, and each of the pair of exhaust valves 17 starts opening before the in-cylinder pressure reaches the peak, so that blowdown energy occurring upon opening of the pair of exhaust valves 17 is relatively low. Thus, the amplitude of the exhaust pulsation becomes relatively small, so that exhaust noise is not so significantly generated.

The ECU 13 is configured to, when the retard amount of the ignition timing is 16° CA·ATDC (two-dot chain line), i.e., the external load is highest, set the valve opening start timing EVO of the pair of exhaust valves 17 to 126° CA·ATDC (54° CA·BBDC), in the same manner. This valve opening start timing EVO (=126° CA·ATDC) is set to a point delayed with respect to 90° CA·ATDC at which the in-cylinder pressure reaches a peak. In this case, although a value of the peak of the in-cylinder pressure becomes higher due to the smaller retard amount of the ignition timing, the blowdown energy occurring upon opening of the pair of exhaust valves 17 becomes relatively low because each of the pair of exhaust valves 17 starts opening after the in-cylinder pressure reaches the peak, so that exhaust noise is suppressed.

The ECU 13 is further configured to, when the retard amount of the ignition timing is 26° CA·ATDC (broken line), i.e., the external load is equal to the reference load between the lowest load and the highest load, set the valve opening start timing EVO of the pair of exhaust valves 17 to 126° CA·ATDC (54° CA·BBDC), in the same manner. This valve opening start timing EVO (=126° CA·ATDC) is set to a point close to (approximately coincident with) 125° CA·ATDC at which the in-cylinder pressure reaches a peak.

When the external load is relatively low, the peak of the in-cylinder pressure arises at a relatively late timing. Thus, the ECU 13 can set the valve opening start timing EVO of the pair of exhaust valves 17 to an earlier point than the timing of the peak of the in-cylinder pressure, without largely advancing the valve opening start timing EVO. On the other hand, when the external load is relatively high, the peak of the in-cylinder pressure arises at a relatively early timing. Thus, the ECU 13 can set the valve opening start timing EVO of the pair of exhaust valves 17 to a later point than the timing of the peak of the in-cylinder pressure, without largely retarding the valve opening start timing EVO.

(5) Functions, Etc.

As above, in the above embodiment, a rapid catalyst warmup control device for a spark ignition engine is con-figured to, when the catalytic converter 26 provided between the collector pipe 25 and the exhaust pipe 27 is in the un-activated state, increase the intake air amount, as compared to when the catalytic converter 26 is in the activated state under the same idling operation, and retard the ignition timing beyond a top dead center of a compression stroke. This rapid catalyst warmup control device employs the following distinctive configurations.

Specifically, the rapid catalyst warmup control device comprises the ECU 13 configured to set the ignition timing in such a manner that the retard amount from a top dead center of a compression stroke becomes larger as the external load against the engine E becomes lower, and set the valve opening start timing EVO of the pair of exhaust valves 17 in such a manner that, when the external load against the engine E is lower than the reference load (e.g., when the air conditioner 101 is in the OFF state, and the alternator 102 and the oil pump 103 are, respectively, in the minimum electricity-generating state and in the minimum driven state), each of the pair of exhaust valves 17 starts opening, before an in-cylinder pressure reaches a peak, according to combustion of an air-fuel mixture ignited at the set ignition timing, in a subsequent expansion stroke, wherein the in-cylinder pressure is based on an assumption that each of the pair of exhaust valves 17 is maintained in a valve-closed state.

Torque required for maintaining engine rotation becomes smaller as the external load against the engine E becomes lower. Thus, this configuration makes it possible to increase the retard amount of the ignition timing from a top dead center of a compression stroke, along with lowering of the external load against the engine E. Thus, as the external load against the engine E becomes lower, a timing at which the in-cylinder pressure reaches a peak, according to combustion of an air-fuel mixture in the expansion stroke is delayed, and a value of the peak of the in-cylinder pressure becomes lower.

More specifically, when the external load against the engine E is lower than the reference load, each of the pair of exhaust valves 17 starts opening before the in-cylinder pressure reaches a peak (see "retard amount: 36° CA" in FIG. 11). Thus, an air-fuel mixture capable of successively burning is discharged to the independent exhaust pipes 23a to 23d, the merged pipes 24a, 24b and the collector pipe 25 to thereby reliably increase the exhaust gas temperature and thus the exhaust gas heat amount to reliably activate the catalyst converter 26. On the other hand, as regards exhaust noise, the peak value of the in-cylinder pressure is relatively low because the retard amount of the ignition timing is set to a relatively large value when the external load is relatively low, and each of the pair of exhaust valves 17 starts opening before the in-cylinder pressure reaches a peak. Thus, the blowdown energy occurring upon opening of the pair of exhaust valves 17 becomes relatively low, and thereby exhaust noise is not so significantly generated. That is, it becomes possible to achieve a good balance between catalytic activation and exhaust noise.

As above, the above embodiment provides a rapid catalyst warmup control device for a spark ignition engine, capable of, during execution of the AWS, suppressing exhaust noise while maintaining an effect of achieving rapid activation of the catalytic converter 26.

In the above embodiment, the multi-hole fuel injector 11 configured to inject fuel directly into the cylinder is provided, and the ECU 13 is configured to set an injection timing of the multi-hole injector 11 in such a manner that an air-fuel mixture in the cylinder becomes relatively rich around the spark plug 14 at the set ignition timing (see "first stage injection" and "second stage injection" in FIG. 9).

Even when the ignition timing is largely retarded during execution of the AWS, this configuration allows an air-fuel mixture to be combusted in a stable and reliable manner, without causing instability in combustion state.

In the above embodiment, the ECU 13 is configured to set the valve opening start timing EVO of the pair of exhaust valves 17 in such a manner that, when the external load against the engine E is higher than the reference load (e.g., when the air conditioner 101 is in the ON state, and the alternator 102 and the oil pump 103 are, respectively, in the maximum electricity-generating state and in the maximum driven state), each of the pair of exhaust valves 17 starts opening, after the in-cylinder pressure reaches the peak, according to combustion of an air-fuel mixture ignited at the set ignition timing, in the expansion stroke.

In this configuration, although the peak value of the in-cylinder pressure becomes relatively high because the retard amount of the ignition timing is set to a relatively small value when the external load against the engine E is higher than the reference load, each of the pair of exhaust valves 17 starts opening after the in-cylinder pressure reaches a peak (see "retard amount: 16° CA" in FIG. 11). Thus, the blowdown energy occurring upon opening of the pair of exhaust valves 17 becomes relatively low, and thereby exhaust noise is suppressed. On the other hand, as regards catalytic activation, although the exhaust gas temperature is relatively lowered because the retard amount of the ignition timing is small, as compared to when the external load against the engine E is lower than the reference load, the ignition timing is still retarded beyond the top dead center of a compression stroke to increase the exhaust gas temperature and thus the exhaust gas heat amount. Thus, the effect of achieving rapid activation of the catalytic converter 26 is sufficiently maintained. That is, in this case, it also becomes possible to achieve a good balance between catalytic activation and exhaust noise.

In the above embodiment, the valve opening start timing EVO of the pair of exhaust valves 17 is set to 126° CA·ATDC (54° CA·BBDC). However, the valve opening start timing EVO is not limited thereto, but may be variously changed, for example, depending on a timing at which the peak of the in-cylinder pressure arises. For example, in a preferred embodiment, the valve opening start timing EVO may be variously set in the range of 120° CA·ATDC (60° CA·BBDC) to 140° CA·ATDC (40° CA·BBDC).

In the above embodiment, irrespective of a level of the external load, the valve opening start timing EVO of the pair of exhaust valves 17 is always set to 126° CA·ATDC (54° CA·BBDC). However, the valve opening start timing EVO is not limited thereto, but may be variously changed depending on the level of the external load, in such a manner as to be set to a point earlier than a timing of the peak of the in-cylinder pressure, when the external load is lower than the reference load, and set to a point later than the timing of the peak of the in-cylinder pressure, when the external load is higher than the reference load. For example, in a preferred embodiment, the valve opening start timing EVO may be variously set in the range of 120° CA·ATDC (60° CA·BBDC) to 140° CA·ATDC (40° CA·BBDC).

Although the vehicle used in the above embodiment is an AT vehicle, it is not limited thereto, but may be an MT vehicle equipped with a manual transmission (MT) as the transmission T. In this case, the torque converter as a heavy object is not coupled to the crankshaft 1. Thus, the external load against the engine E is generally lowered, as compared to the AT vehicle, so that it becomes possible to further increase the retard amount of the ignition timing during execution of the AWS.

For example, in order to allow the valve opening start timing EVO of the pair of exhaust valves 17 to be set to a point earlier than the timing of the peak of the in-cylinder pressure, the ECU 13 may be configured to control a degree of driving, an ON/OFF state or the like of the air conditioner 101, the alternator 102 and the oil pump 103 to forcibly reduce the external load against the engine E to a level lower than the reference load. In this case, the ECU 13 is equivalent to "external load reducing section" set forth in the appended claims.

This configuration allows the peak of the in-cylinder pressure to be intentionally delayed and lowered. Therefore, it becomes possible to set the valve opening start timing EVO of the pair of exhaust valves 17 to a point earlier than the timing of the peak of the in-cylinder pressure, depending on situations, to easily achieve a good balance between catalytic activation and exhaust noise.

In the case where the valve opening start timing EVO of the pair of exhaust valves 17 is set to a point earlier than the timing of the peak of the in-cylinder pressure, the ECU 13 may be configured to set respective valve opening start timings EVO of the pair of exhaust valves 17 provided per cylinder 4 in such a manner that the valve opening start timings EVO become different from each other, and, one of the pair of exhaust valves 17 having an earlier valve opening start timing starts opening, before an in-cylinder pressure reaches a peak, wherein the in-cylinder pressure is based on an assumption that each of the pair of exhaust valves 17 is maintained in a valve-closed state. In this case, the ECU 13 is equivalent to "exhaust valve opening timing setting section" set forth in the appended claims.

In this configuration, the pair of exhaust valves 17 provided per cylinder 4 start opening at respective different timings, so that turbulence occurs in a flow of exhaust gas flow discharged to the exhaust ports 10 and therefore exhaust gas in the independent exhaust pipes 23a to 23d, the merged pipes 24a, 24b and the collector pipe 25 is agitated, thereby promoting after-burning within these pipes. Thus, it becomes possible to achieve after-burning in a region closer to the catalytic converter 26. This is further advantageous in terms of catalytic activation.

Second Embodiment

Next, a second embodiment of the present invention will be described. The second embodiment is the same as the first embodiment in terms of the features illustrated in FIGS. 1 to 10, and different from the first embodiment in terms of a feature illustrative in FIG. 12 used as substitute for FIG. 11. Thus, only this feature will be described, and description of the remaining features will be omitted.

Figure 12A:
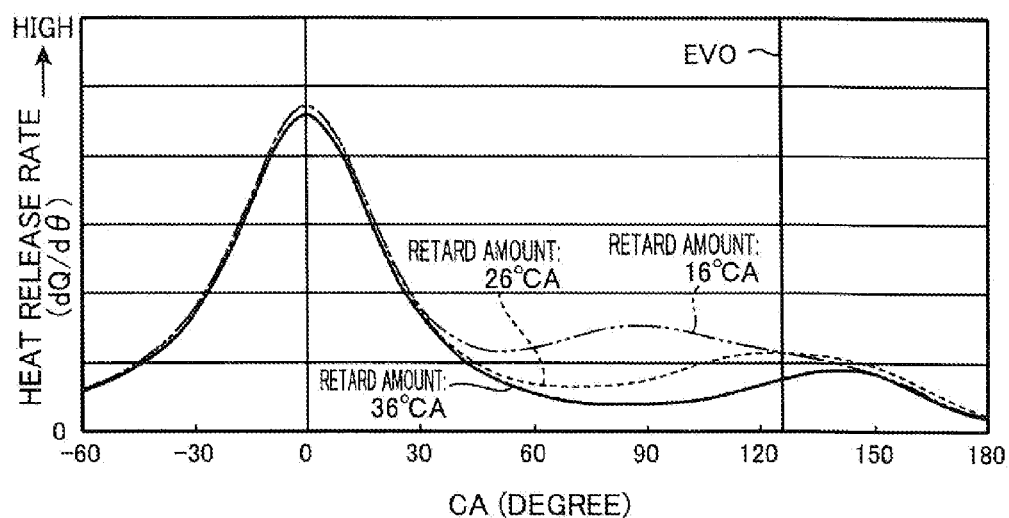
FIG. 12A is a time chart of a heat release rate during execution of the AWS in a spark ignition engine according to a second embodiment of the present invention, under the condition that a retard amount of an ignition timing is set to 16° CA·ATDC, 26° CA·ATDC, and 36° CA·ATDC, wherein a valve opening timing of an exhaust valve is superposed thereon.
Figure 12B:
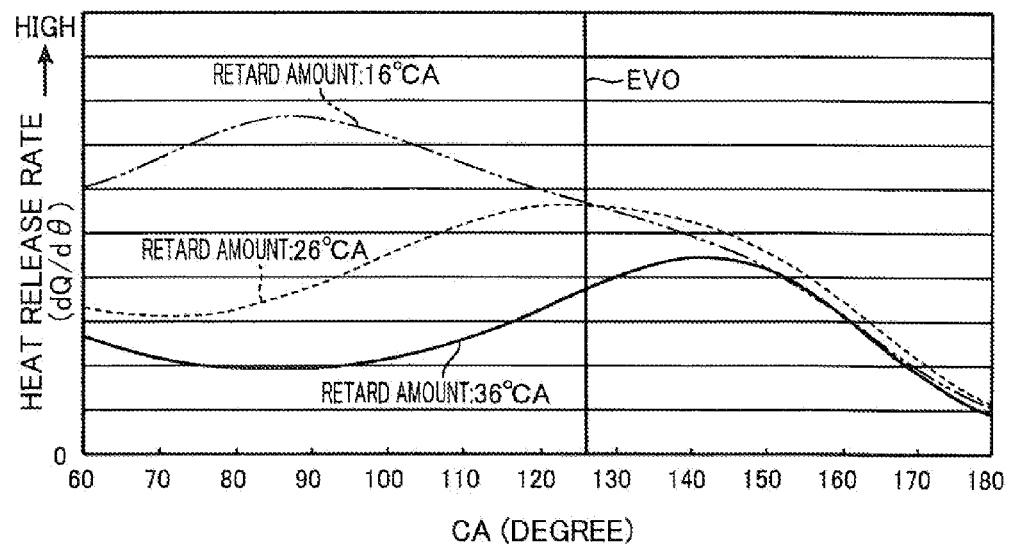
FIG. 12B is an enlarged time chart of a part of the time chart of FIG. 12A corresponding to a last half of an expansion stroke.

FIG. 12A is a time chart of a heat release rate during execution of the AWS under the condition that the retard amount of the ignition timing is set to 16° CA·ATDC (after a top dead center of a compression stroke), 26° CA·ATDC, and 36° CA·ATDC, wherein the valve opening timing EVO of the pair of exhaust valves 17 is superposed thereon, and FIG. 12B is an enlarged time chart of a part of the time chart of FIG. 12A corresponding to a last half of a subsequent expansion stroke.

Each of the time charts of FIGS. 12A and 12B indicates changes (waveform) of a heat release rate (dQ/dθ) or a heat release amount per unit crank angle. This characteristic is preliminarily determined by way of experiment, and data about the characteristic is stored in the ECU 13.

As can be understood from a comparison between FIG. 11 and FIG. 12, the in-cylinder pressure based on the assumption that each of the pair of exhaust valves 17 is maintained in the valve-closed state during the expansion stroke, and the heat release rate (dQ/dθ), have similar waveforms. Thus, the second embodiment is different from the first embodiment only in that the in-cylinder pressure in the first embodiment is replaced with the heat release rate.

That is, in the second embodiment, a rapid catalyst warmup control device for a spark ignition engine is configured to, when the catalytic converter 26 provided between the collector pipe 25 and the exhaust pipe 27 is in the un-activated state, increase the intake air amount, as compared to when the catalytic converter 26 is in the activated state under the same idling operation, and retard the ignition timing beyond a top dead center of a compression stroke. This rapid catalyst warmup control device employs the following distinctive configurations.

The ECU 13 provided in the second embodiment is configured to set the ignition timing in such a manner that the retard amount from a top dead center of a compression stroke becomes larger as the external load against the engine E becomes lower, and set the valve opening start timing EVO of the pair of exhaust valves 17 in such a manner that, when the external load against the engine E is lower than the reference load (e.g., when the air conditioner 101 is in the OFF state, and the alternator 102 and the oil pump 103 are, respectively, in the minimum electricity-generating state and in the minimum driven state), each of the pair of exhaust valves 17 starts opening, before the heat release rate (dQ/dθ) or a heat release amount per unit crank angle reaches a peak, according to combustion of an air-fuel mixture ignited at the set ignition timing, in a subsequent expansion stroke.

The ECU 13 is also configured to set the valve opening start timing EVO of the pair of exhaust valves 17 in such a manner that, when the external load against the engine E is higher than the reference load (e.g., when the air conditioner 101 is in the ON state, and the alternator 102 and the oil pump 103 are, respectively, in the maximum electricity-generating state and in the maximum driven state), each of the pair of exhaust valves 17 starts opening, after the heat release rate reaches the peak, according to combustion of an air-fuel mixture ignited at the set ignition timing, in the expansion stroke.

In the case where the valve opening start timing EVO of the pair of exhaust valves 17 is set to a point earlier than the timing of the peak of the heat release rate, the ECU 13 may be configured to set respective valve opening start timings EVO of the pair of exhaust valves 17 provided per cylinder 4 in such a manner that the valve opening start timings EVO become different from each other, and, one of the pair of exhaust valves 17 having an earlier valve opening start timing starts opening, before the heat release rate reaches the peak.

The present invention described above will be outlined as follows.

According to a first aspect of the present invention, there is provided a rapid catalyst warmup control device for a spark ignition engine, which is configured to, when a catalytic converter provided in an exhaust passage is in an un-activated state, increase an intake air amount, as compared to when the catalytic converter is in an activated state under a same engine operation condition, and retard an ignition timing beyond a top dead center of a compression stroke. The rapid catalyst warmup control device comprises: an ignition timing setting section configured to set the ignition timing in such a manner that a retard amount thereof from a top dead center of a compression stroke becomes larger as an external load causing a rotational resistance of the engine becomes lower; and an exhaust valve opening timing setting section configured to set a valve opening start timing of an exhaust valve in such a manner that, when the external load is lower than a given reference load, the exhaust valve starts opening, before an in-cylinder pressure reaches a peak, according to combustion of an air-fuel mixture ignited at the ignition timing set by the ignition timing setting section, in a subsequent expansion stroke, wherein the in-cylinder pressure is based on an assumption that the exhaust valve is maintained in a valve-closed state.

In the first aspect of the present invention, considering that torque required for maintaining an engine speed becomes smaller as the external load against the engine (e.g., an auxiliary component such as an alternator, an oil pump or an air conditioner, or a torque converter in an AT vehicle) becomes lower, the retard amount of the ignition timing from a top dead center of a compression stroke can be increased along with lowering of the external load against the engine. Thus, on an assumption that each of an intake air amount and a fuel injection amount is kept constant, as the external load against the engine becomes lower, a timing at which the in-cylinder pressure reaches a peak, according to combustion of an air-fuel mixture in the expansion stroke is delayed, and a value of the peak of the in-cylinder pressure becomes lower.

More specifically, when the external load against the engine is lower than the reference load, the exhaust valve starts opening before the in-cylinder pressure reaches the peak. Thus, an air-fuel mixture capable of successively burning is discharged to the exhaust passage to thereby reliably increase an exhaust gas temperature and thus an exhaust gas heat amount to reliably activate the catalyst converter. On the other hand, as regards exhaust noise, the peak value of the in-cylinder pressure is relatively low because the retard amount of the ignition timing is set to a relatively large value when the external load is relatively low, and the exhaust valve starts opening before the in-cylinder pressure reaches the peak. Thus, blowdown energy occurring upon opening of the exhaust valve becomes relatively low, and thereby exhaust noise is not so significantly generated. That is, it becomes possible to achieve a good balance between catalytic activation and exhaust noise.

Accordingly, the first aspect of the present invention provides a rapid catalyst warmup control device for a spark ignition engine, capable of, during execution of the AWS, suppressing exhaust noise while maintaining an effect of achieving rapid activation of the catalytic converter.

When the external load is relatively low, the peak of the in-cylinder pressure arises at a relatively late timing. Thus, the valve opening start timing of the exhaust valve can be set to an earlier point than a timing of the peak of the in-cylinder pressure, without largely advancing the valve opening start timing of the exhaust valve.

Preferably, the rapid catalyst warmup control device according to the first aspect of the present invention comprises a fuel injection valve configured to inject fuel directly into a cylinder, and an injection timing setting section configured to set an injection timing of the fuel injection valve in such a manner that an air-fuel mixture in the cylinder becomes relatively rich around a spark plug at the ignition timing set by the ignition timing setting section.

Even when the ignition timing is largely retarded, this configuration allows an air-fuel mixture to be combusted in a stable and reliable manner, without causing instability in combustion state.

Preferably, in the first aspect of the present invention, the exhaust valve opening timing setting section is configured to set the valve opening start timing of the exhaust valve in such a manner that, when the external load is higher than the reference load, the exhaust valve starts opening, after the in-cylinder pressure reaches the peak.

In this configuration, although the peak value of the in-cylinder pressure becomes relatively high because the retard amount of the ignition timing is set to a relatively small value when the external load against the engine is relatively high, the exhaust valve starts opening after the in-cylinder pressure reaches the peak. Thus, the blowdown energy occurring upon opening of the exhaust valve becomes relatively low, and thereby exhaust noise is suppressed. On the other hand, as regards catalytic activation, although the exhaust gas temperature is relatively lowered because the retard amount of the ignition timing is small, as compared to when the external load against the engine is lower than the reference load, the ignition timing is still retarded beyond a top dead center of a compression stroke to increase the exhaust gas temperature and thus the exhaust gas heat amount. Thus, the effect of achieving rapid activation of the catalytic converter is sufficiently maintained. That is, in this case, it also becomes possible to achieve a good balance between catalytic activation and exhaust noise.

When the external load is relatively high, the peak of the in-cylinder pressure arises at a relatively early timing. Thus, the valve opening start timing of the exhaust valve can be set to a later point than a timing of the peak of the in-cylinder pressure, without largely retarding the valve opening start timing of the exhaust valve.

Preferably, the rapid catalyst warmup control device according to the first aspect of the present invention comprises an external load reducing section configured to forcibly reduce the external load.

This configuration allows the peak of the in-cylinder pressure to be intentionally delayed and lowered. Therefore, it becomes possible to set the valve opening start timing of the exhaust valve to a point earlier than the timing of the peak of the in-cylinder pressure, depending on situations, to easily achieve a good balance between catalytic activation and exhaust noise.

Preferably, in the first aspect of the present invention, the exhaust valve is provided in a plural number per cylinder, wherein the exhaust valve opening timing setting section is configured to set respective valve opening start timings of the plurality of exhaust valves in such a manner that the valve opening start timings become different from each other, and, one of the exhaust valves having an earlier valve opening start timing starts opening, before the in-cylinder pressure based on the assumption that each of the exhaust valves is maintained in the valve-closed state reaches the peak.

In this configuration, the plurality of exhaust valves start opening at respective different timings, so that turbulence occurs in a flow of exhaust gas flow discharged to an exhaust port and therefore exhaust gas in the exhaust passage is agitated, thereby promoting after-burning within the exhaust passage. Thus, it becomes possible to achieve after-burning in a region closer to the catalytic converter. This is further advantageous in terms of catalytic activation.

According to a second aspect of the present invention, there is provided a rapid catalyst warmup control device for a spark ignition engine, which is configured to, when a catalytic converter provided in an exhaust passage is in an un-activated state, increase an intake air amount, as compared to when the catalytic converter is in an activated state under a same engine operation condition, and retard an ignition timing beyond a top dead center of a compression stroke. The rapid catalyst warmup control device comprises: an ignition timing setting section configured to set the ignition timing in such a manner that a retard amount thereof from a top dead center of a compression stroke becomes larger as an external load causing a rotational resistance of the engine becomes lower; and an exhaust valve opening timing setting section configured to set a valve opening start timing of an exhaust valve in such a manner that, when the external load is lower than a given reference load, the exhaust valve starts opening, before a heat release rate or a heat release amount per unit crank angle reaches a peak, according to combustion of an air-fuel mixture ignited at the ignition timing set by the ignition timing setting section, in a subsequent expansion stroke.

In the second aspect of the present invention, considering that torque required for maintaining engine rotation becomes smaller as the external load against the engine (e.g., an auxiliary component such as an alternator, an oil pump or an air conditioner, or a torque converter in an AT vehicle) becomes lower, the retard amount of the ignition timing from a top dead center of a compression stroke can be increased along with lowering of the external load against the engine. Thus, on an assumption that each of the intake air amount and the fuel injection amount is kept constant, as the external load against the engine becomes lower, a timing at which the heat release rate (dQ/dθ) or a heat release amount per unit crank angle reaches a peak, according to combustion of an air-fuel mixture in the expansion stroke is delayed, and a value of the peak of the heat release rate becomes lower.

More specifically, when the external load against the engine is lower than the reference load, the exhaust valve starts opening before the heat release rate reaches the peak. Thus, an air-fuel mixture capable of successively burning is discharged to the exhaust passage to thereby reliably increase the exhaust gas temperature and thus the exhaust gas heat amount to reliably activate the catalyst converter. On the other hand, as regards exhaust noise, the peak value of the heat release rate is relatively low because the retard amount of the ignition timing is set to a relatively large value when the external load is relatively low, and the exhaust valve starts opening before the heat release rate reaches the peak. Thus, the blowdown energy occurring upon opening of the exhaust valve becomes relatively low, and thereby exhaust noise is not so significantly generated. That is, it becomes possible to achieve a good balance between catalytic activation and exhaust noise.

Accordingly, the second aspect of the present invention provides a rapid catalyst warmup control device for a spark ignition engine, capable of, during execution of the AWS, suppressing exhaust noise while maintaining an effect of achieving rapid activation of the catalytic converter.

When the external load is relatively low, the peak of the heat release rate arises at a relatively late timing. Thus, the valve opening start timing of the exhaust valve can be set to an earlier point than a timing of the peak of the heat release rate, without largely advancing the valve opening start timing of the exhaust valve.

Preferably, in the second aspect of the present invention, the exhaust valve opening timing setting section is configured to set the valve opening start timing of the exhaust valve in such a manner that, when the external load is higher than the reference load, the exhaust valve starts opening, after the heat release rate reaches the peak.

In this configuration, although the peak value of the heat release rate becomes relatively high because the retard amount of the ignition timing is set to a relatively small value when the external load against the engine is relatively high, the exhaust valve starts opening after the heat release rate reaches the peak. Thus, the blowdown energy occurring upon opening of the exhaust valve becomes relatively low, and thereby exhaust noise is suppressed. On the other hand, as regards catalytic activation, although the exhaust gas temperature is relatively lowered because the retard amount of the ignition timing is small, as compared to when the external load against the engine is lower than the reference load, the ignition timing is still retarded beyond a top dead center of a compression stroke to increase the exhaust gas temperature and thus the exhaust gas heat amount. Thus, the effect of achieving rapid activation of the catalytic converter is sufficiently maintained. That is, in this case, it also becomes possible to achieve a good balance between catalytic activation and exhaust noise.

When the external load is relatively high, the peak of the heat release rate arises at a relatively early timing. Thus, the valve opening start timing of the exhaust valve can be set to a later point than a timing of the peak of the heat release rate, without largely retarding the valve opening start timing of the exhaust valve.

Preferably, the rapid catalyst warmup control device according to the second aspect of the present invention comprises an external load reducing section configured to forcibly reduce the external load.

This configuration allows the peak of the heat release rate to be intentionally delayed and lowered. Therefore, it becomes possible to set the valve opening start timing of the exhaust valve to a point earlier than the timing of the peak of the heat release rate, depending on situations, to easily achieve a good balance between catalytic activation and exhaust noise.

Preferably, in the second aspect of the present invention, the exhaust valve is provided in a plural number per cylinder, wherein the exhaust valve opening timing setting section is configured to set respective valve opening start timings of the plurality of exhaust valves in such a manner that the valve opening start timings become different from each other, and, one of the exhaust valves having an earlier valve opening start timing starts opening, before the heat release rate reaches the peak.

In this configuration, the plurality of exhaust valves start opening at respective different timings, so that turbulence occurs in a flow of exhaust gas flow discharged to an exhaust port and therefore exhaust gas in the exhaust passage is agitated, thereby promoting after-burning within the exhaust passage. Thus, it becomes possible to achieve after-burning in a region closer to the catalytic converter. This is further advantageous in terms of catalytic activation.

This application is based on Japanese Patent Application Serial No. 2013-005230 filed in Japan Patent Office on Jan. 16, 2013, the contents of which are hereby incorporated by reference.

While the invention of the present application has been described appropriately and fully by way of the embodiment as above with reference to the drawings in order to express the present invention, it should be appreciated that anyone skilled in the art can readily change and/or modify the embodiment described above. Therefore, it should be understood that a changed embodiment or a modified embodiment implemented by anyone skilled in the art is enclosed within the scope of the appended claims unless the changed embodiment or the modified embodiment is of a level that deviates from the scope of the appended claims.

INDUSTRIAL APPLICABILITY

The present invention relates to a rapid catalyst warmup control device for a spark ignition engine, capable of, during execution of the AWS, suppressing exhaust noise while maintaining an effect of achieving rapid activation of a catalytic converter, and therefore can contribute to providing measures against exhaust emissions of an internal combustion engine.

The invention claimed is:

1. A rapid catalyst warmup control device for a spark ignition engine, which is configured to, when a catalytic converter provided in an exhaust passage is in an un-activated state, increase an intake air amount, as compared to when the catalytic converter is in an activated state under a same engine operation condition, and retard an ignition timing beyond a top dead center of a compression stroke, comprising:
   an ignition timing setting section configured to set the ignition timing in such a manner that a retard amount thereof from a top dead center of a compression stroke becomes larger as an external load causing a rotational resistance of the engine becomes lower; and
   an exhaust valve opening timing setting section configured to set a valve opening start timing of an exhaust valve in a subsequent expansion stroke according to combustion of an air-fuel mixture ignited at the ignition timing set by the ignition timing setting section in such a manner that when the external load is lower than a given reference load, the exhaust valve starts opening before an in-cylinder pressure reaches a peak, wherein the in-cylinder pressure is based on the exhaust valve being maintained in a valve-closed state.

2. The rapid catalyst warmup control device as defined in claim 1, which comprises
   a fuel injection valve configured to inject fuel directly into a cylinder, and
   an injection timing setting section configured to set an injection timing of the fuel injection valve in such a manner that an air-fuel mixture in the cylinder becomes a rich air-fuel mixture having an increased fuel concentration around a spark plug at the ignition timing set by the ignition timing setting section.

3. The rapid catalyst warmup control device as defined in claim 1, wherein the exhaust valve opening timing setting section is configured to set the valve opening start timing of the exhaust valve in such a manner that when the external load is higher than the reference load, the exhaust valve starts opening after the in-cylinder pressure reaches the peak.

4. The rapid catalyst warmup control device as defined in claim 1, which comprises an external load reducing section configured to forcibly reduce the external load.

5. The rapid catalyst warmup control device as defined in claim 1, wherein the exhaust valve is provided in a plural number per cylinder, and wherein the exhaust valve opening timing setting section is configured to set respective valve opening start timings of the plurality of exhaust valves in such a manner that the valve opening start timings become different from each other, and one of the exhaust valves having an earlier valve opening start timing starts opening before the in-cylinder pressure reaches the peak.

6. A rapid catalyst warmup control device for a spark ignition engine, which is configured to, when a catalytic converter provided in an exhaust passage is in an unactivated state, increase an intake air amount, as compared to when the catalytic converter is in an activated state under a same engine operation condition, and retard an ignition timing beyond a top dead center of a compression stroke, comprising:

an ignition timing setting section configured to set the ignition timing in such a manner that a retard amount thereof from a top dead center of a compression stroke becomes larger as an external load causing a rotational resistance of the engine becomes lower; and an exhaust valve opening timing setting section configured to set a valve opening start timing of an exhaust valve in a subsequent expansion stroke according to combustion of an air-fuel mixture ignited at the ignition timing set by the ignition timing setting section in such a manner that when the external load is lower than a given reference load, the exhaust valve starts opening before a heat release rate or a heat release amount per unit crank angle reaches a peak.

7. The rapid catalyst warmup control device as defined in claim 6, which comprises a fuel injection valve configured to inject fuel directly into a cylinder, and an injection timing setting section configured to set an injection timing of the fuel injection valve in such a manner that an air-fuel mixture in the cylinder becomes a rich air-fuel mixture having an increased fuel concentration around a spark plug at the ignition timing set by the ignition timing setting section.

8. The rapid catalyst warmup control device as defined in claim 6, wherein the exhaust valve opening timing setting section is configured to set the valve opening start timing of the exhaust valve in such a manner that when the external load is higher than the reference load, the exhaust valve starts opening after the heat release rate reaches the peak.

9. The rapid catalyst warmup control device as defined in claim 6, which comprises an external load reducing section configured to forcibly reduce the external load.

10. The rapid catalyst warmup control device as defined in claim 6, wherein the exhaust valve is provided in a plural number per cylinder, and wherein the exhaust valve opening timing setting section is configured to set respective valve opening start timings of the plurality of exhaust valves in such a manner that the valve opening start timings become different from each other and one of the exhaust valves that has an earlier valve opening start timing starts opening before the heat release rate reaches the peak.

11. A rapid catalyst warm up control device for a spark ignition engine, which is configured to, when a catalytic converter provided in an exhaust passage is in an unactivated state, increase an intake air amount, as compared to when the catalytic converter is in an activated state under a same engine operation condition, and retard an ignition timing beyond a top dead center of a compression stroke, comprising:

an ignition timing setting section configured to set the ignition timing in such a manner that a retard amount thereof from a top dead center of a compression stroke becomes larger as an external load causing a rotational resistance of the engine becomes lower; and an exhaust valve opening timing setting section configured to set a valve opening start timing of an exhaust valve in a subsequent expansion stroke according to combustion of an air-fuel mixture ignited at the ignition timing set by the ignition timing setting section in such a manner that when the external load is lower than a given reference load, the exhaust valve starts opening before an in-cylinder pressure reaches a peak, wherein the in-cylinder pressure is based on the exhaust valve being maintained in a valve-closed state, wherein the exhaust opening timing setting section is configured to set a valve opening timing of an exhaust valve in a subsequent expansion stroke according to combustion of an air-fuel mixture ignited at the ignition timing set by the ignition timing setting section in such a manner that when the external load is equal to the reference load, the exhaust valve starts opening approximately coincident with when an in-cylinder pressure reaches a peak, wherein the in-cylinder pressure is based on the exhaust valve being maintained in a valve-closed state.

* * * * *